(12) United States Patent
Gosselin et al.

(10) Patent No.: US 7,845,700 B2
(45) Date of Patent: Dec. 7, 2010

(54) EXTENDABLE TRAILER HAVING A ROLL SUPPORT ASSEMBLY

(75) Inventors: Denis Gosselin, Saint-Georges (CA); James A. Maiorana, Hartville, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 0 days.

(21) Appl. No.: 12/322,045

(22) Filed: Jan. 28, 2009

(65) Prior Publication Data
US 2009/0160163 A1  Jun. 25, 2009

Related U.S. Application Data

(63) Continuation-in-part of application No. 12/070,450, filed on Feb. 19, 2008, now Pat. No. 7,677,625.

(51) Int. Cl.
*B62D 21/14* (2006.01)
(52) U.S. Cl. ............... 296/26.1; 296/184.1; 280/149.2; 280/785; 280/789; 280/799
(58) Field of Classification Search ... 296/26.08–26.11, 296/184.1, 204; 280/785, 789, 799, 149.2
See application file for complete search history.

(56) References Cited

U.S. PATENT DOCUMENTS

| | | | | | |
|---|---|---|---|---|---|
| 3,232,465 | A | * | 2/1966 | Romine et al. | 414/668 |
| 3,239,274 | A | * | 3/1966 | Weiss | 298/17 R |
| 4,289,442 | A | * | 9/1981 | Stevens | 414/629 |
| 4,526,395 | A | * | 7/1985 | Arguin | 280/408 |
| 4,958,845 | A | * | 9/1990 | Parks | 280/407.1 |
| 5,183,371 | A | * | 2/1993 | O'Daniel | 414/477 |
| 5,777,243 | A | * | 7/1998 | Kewish | 73/865.6 |

* cited by examiner

*Primary Examiner*—Dennis H Pedder
(74) *Attorney, Agent, or Firm*—Sand & Sebolt

(57) ABSTRACT

An apparatus comprising a front flatbed trailer section, a rear flatbed trailer section, a first support assembly carried by one of the front and rear flatbed trailer sections, and wherein the first support assembly at least partially disengages the other of the front and rear flatbed trailer sections. A method of extending a trailer comprising the steps of providing a first flatbed trailer section and a second flatbed trailer section with a slide member and a first support assembly, displacing the first support assembly in a first direction, separating the first and second flatbed trailer sections in a vertical direction, and moving one of the first and second flatbed trailer sections in a horizontal direction relative to the other of the first and second flatbed trailer sections.

20 Claims, 38 Drawing Sheets

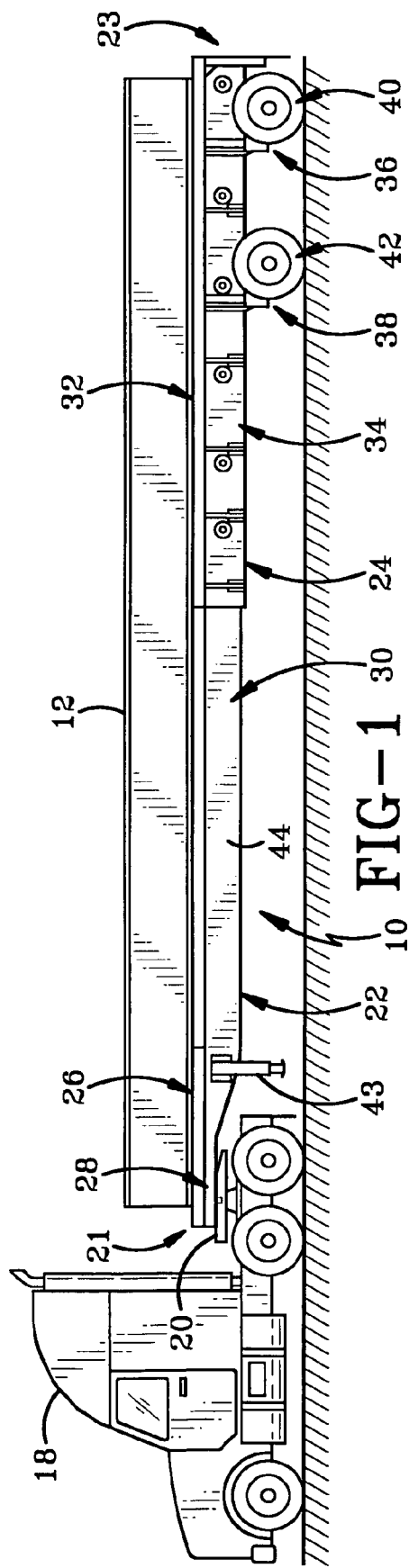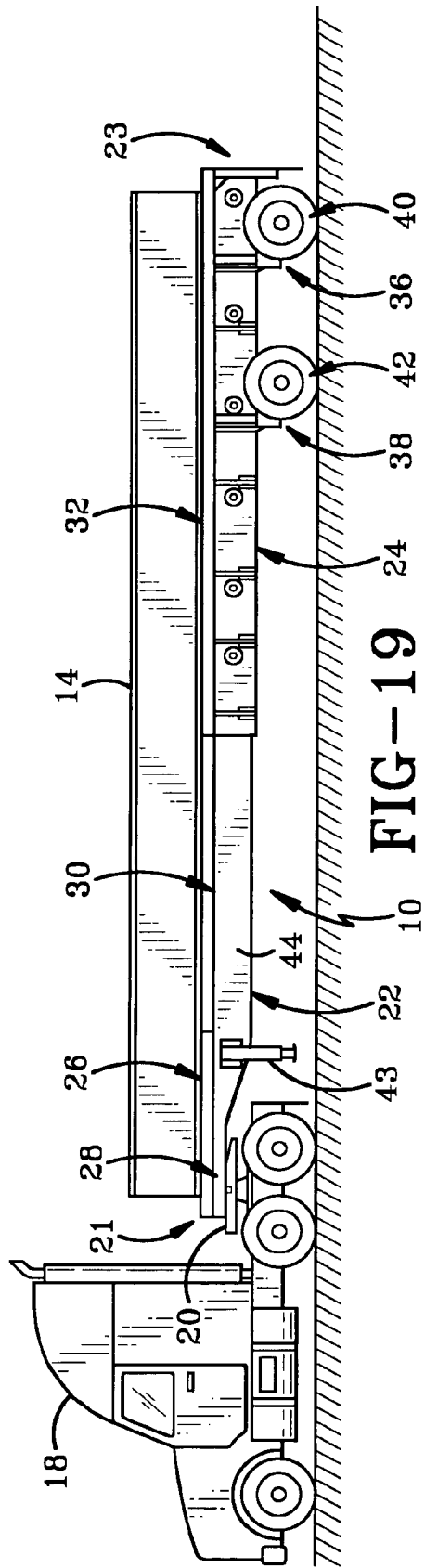

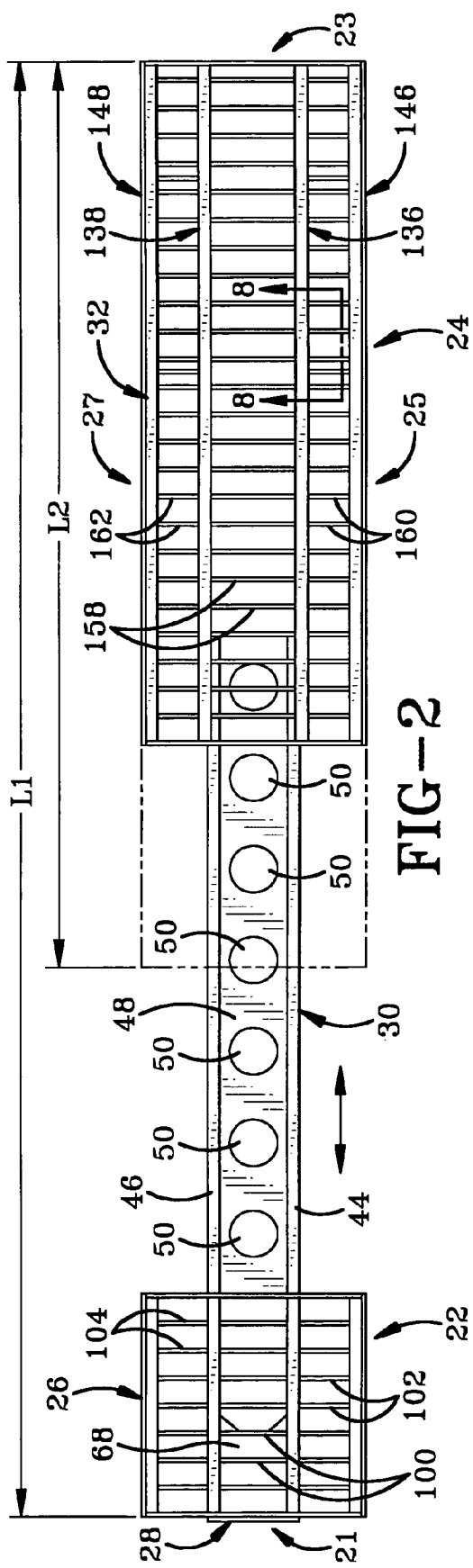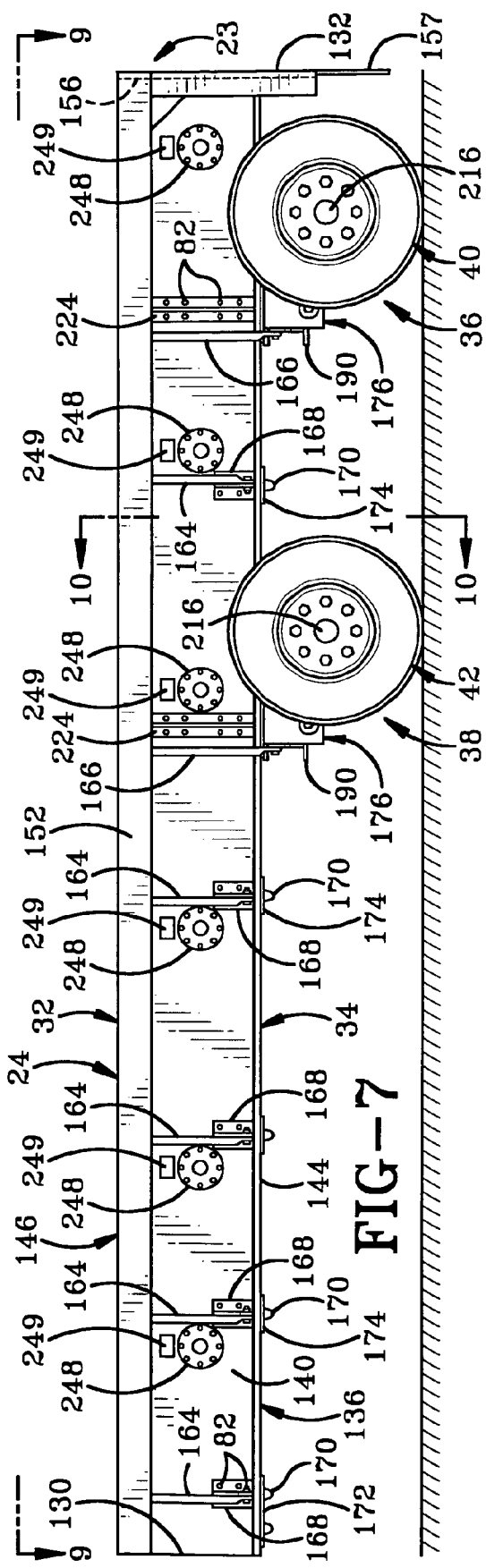

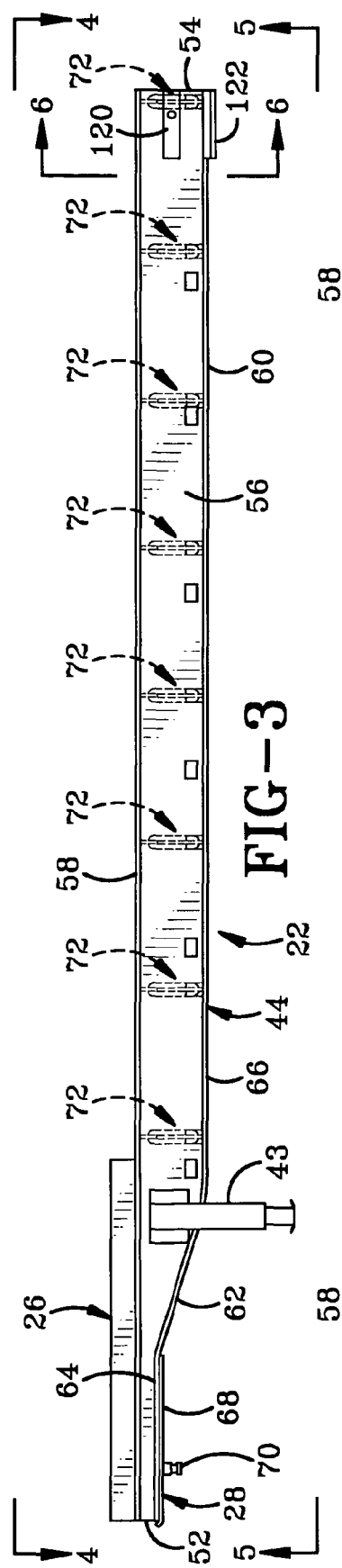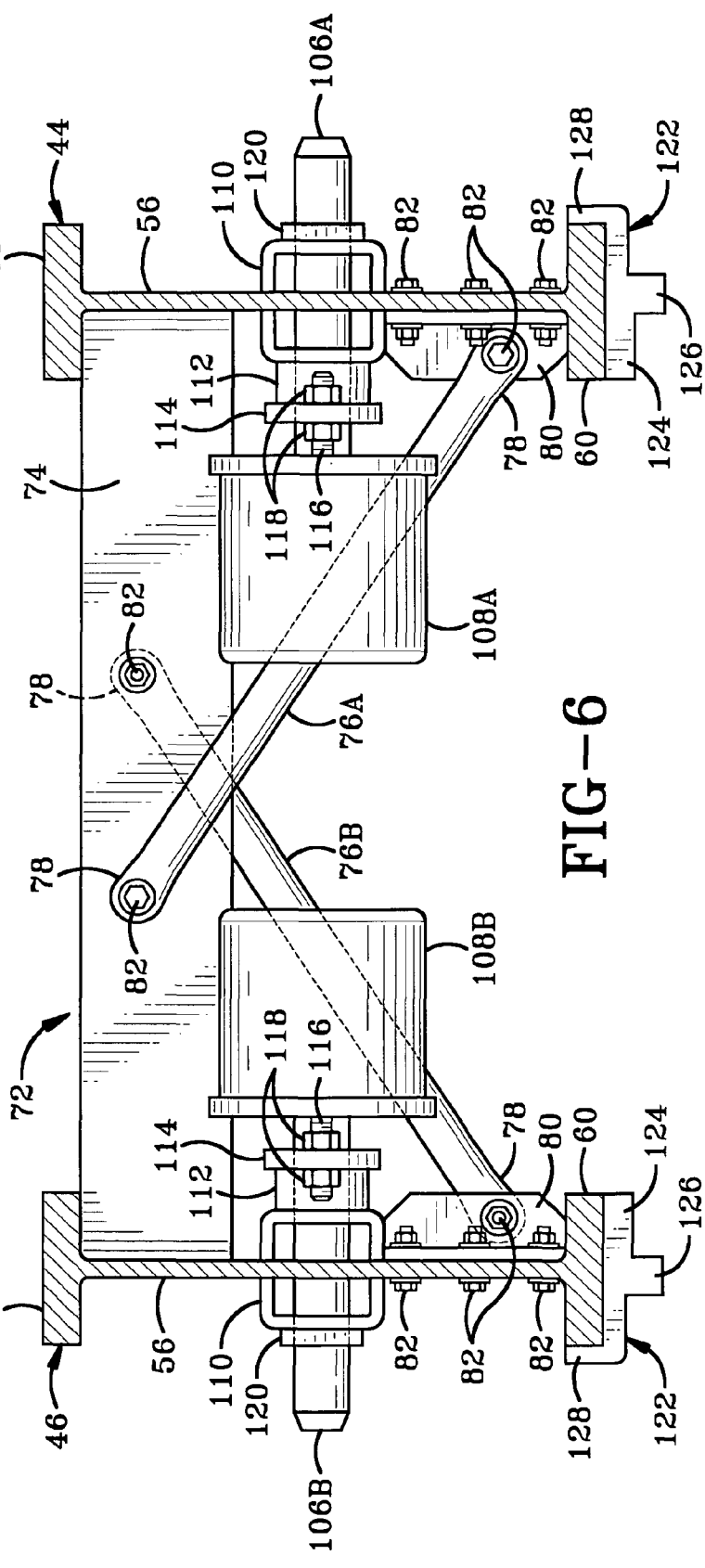

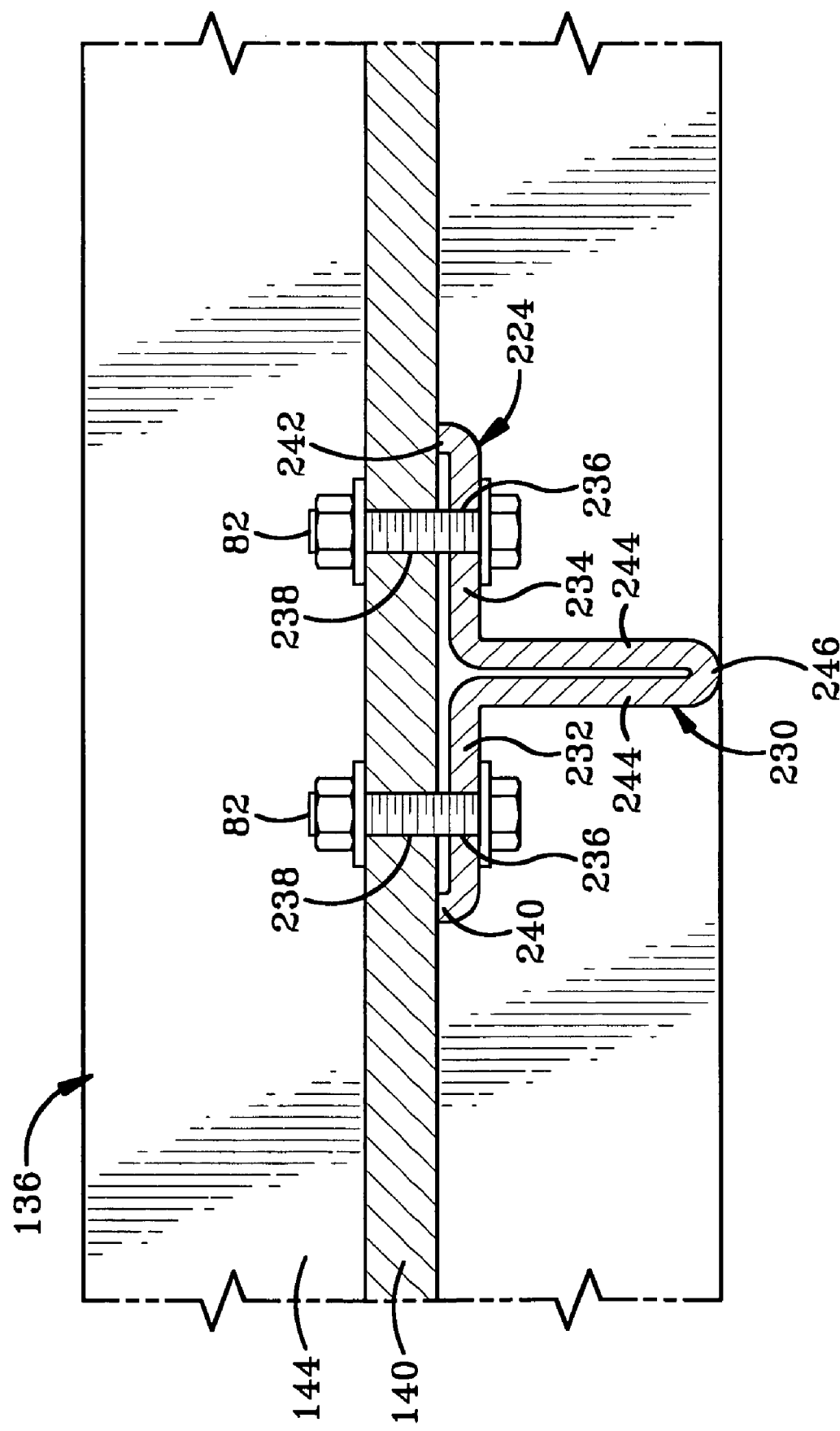

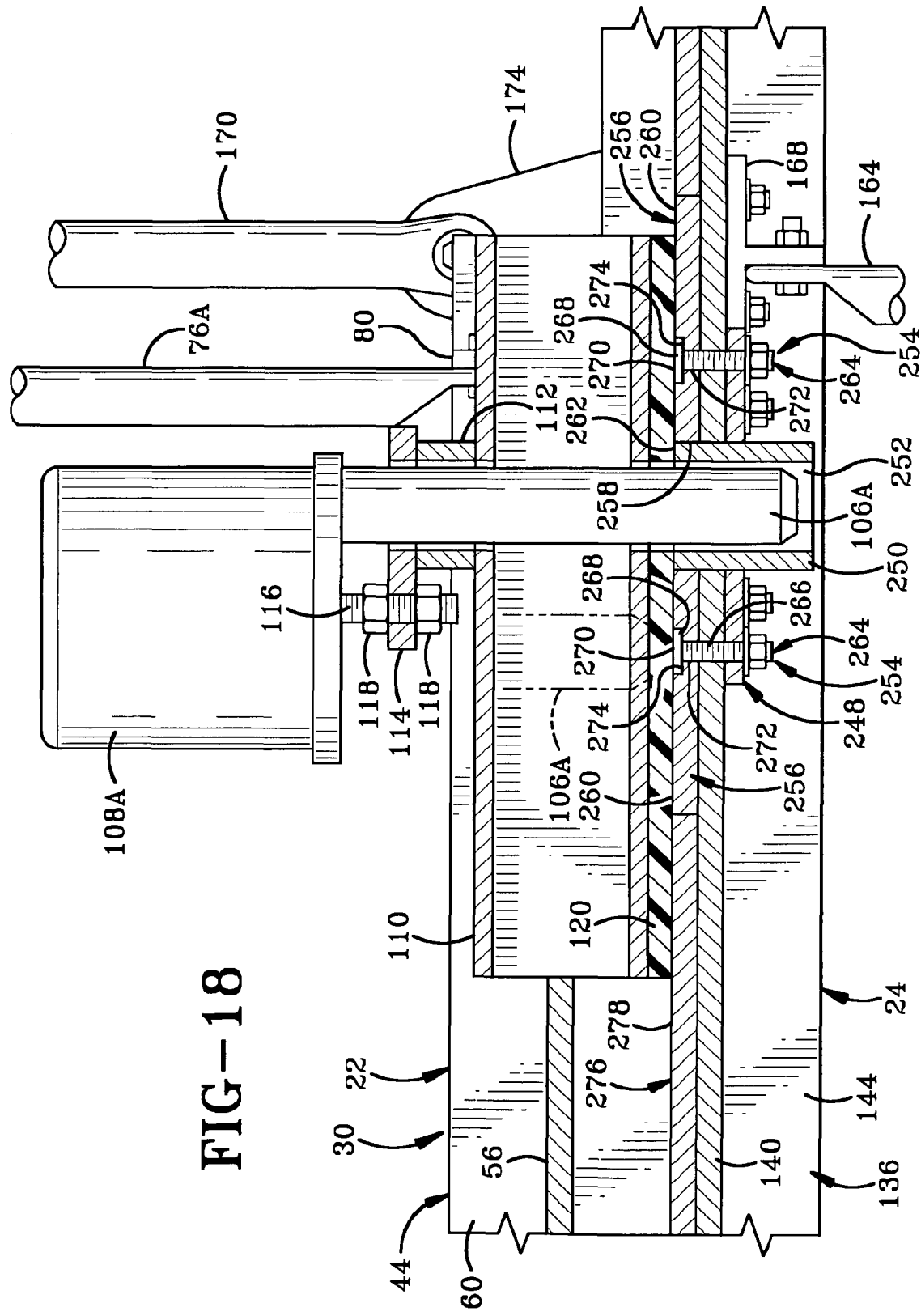

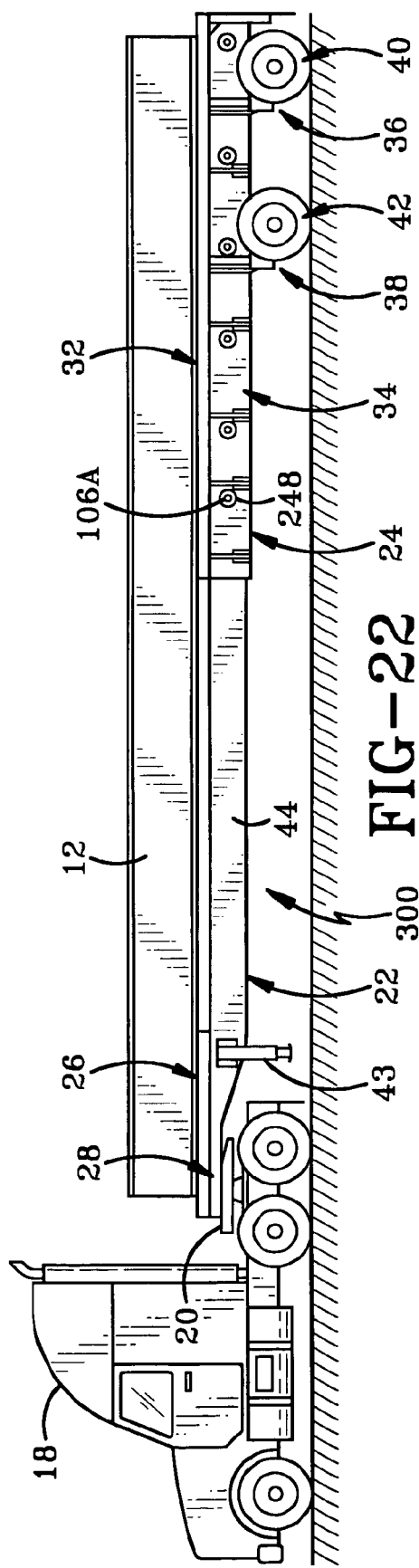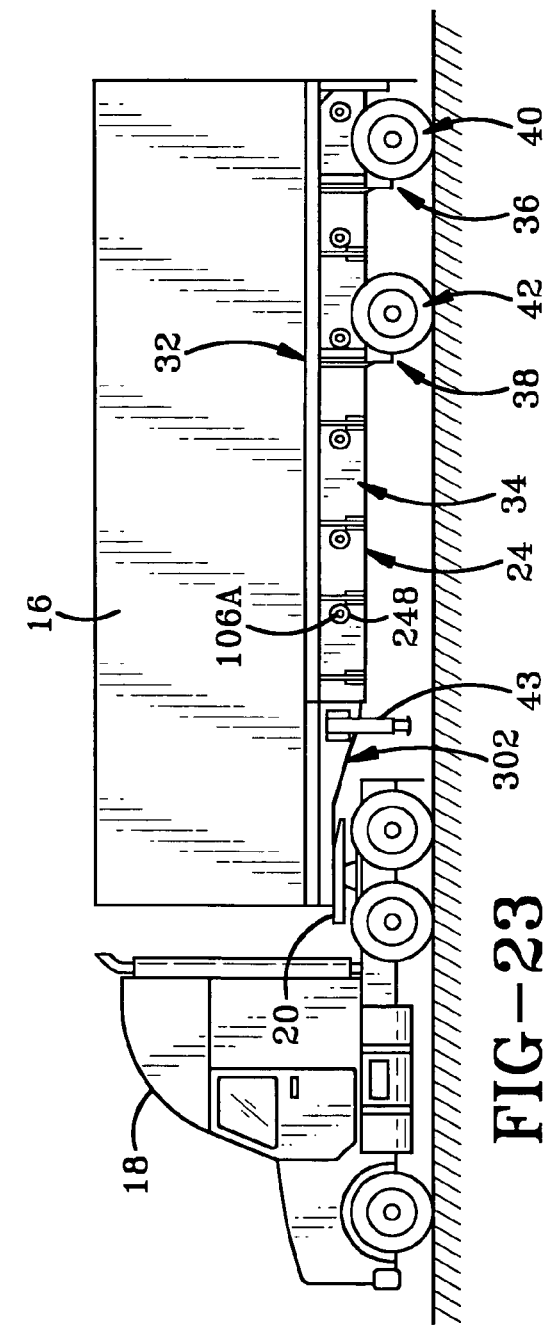

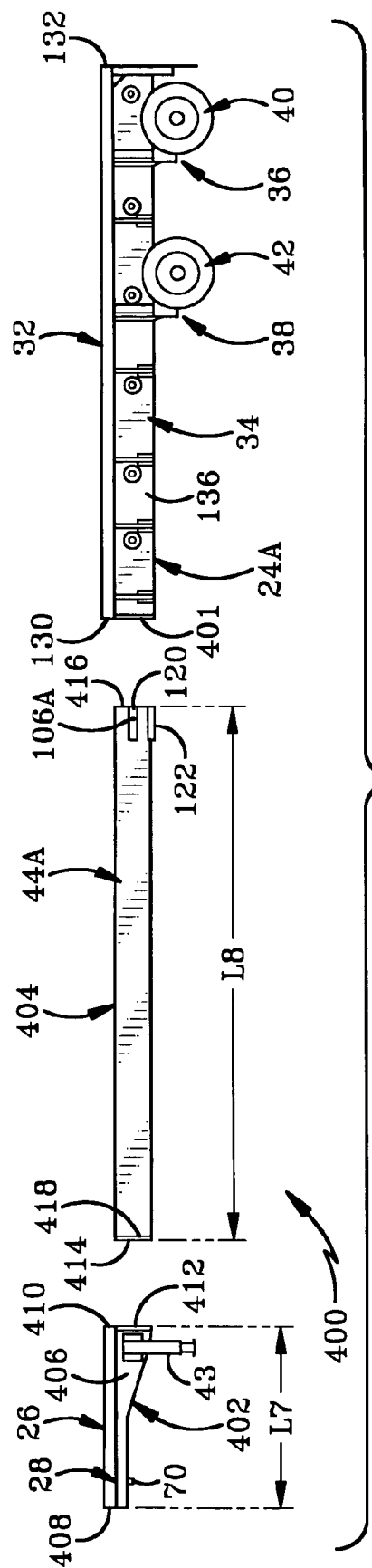
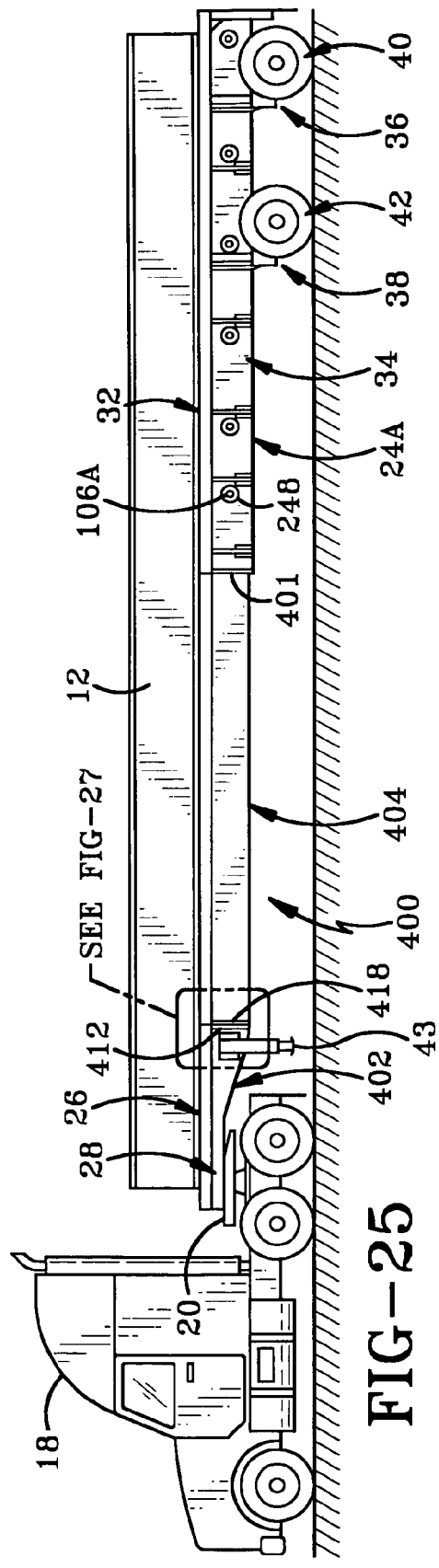
FIG-24
FIG-25

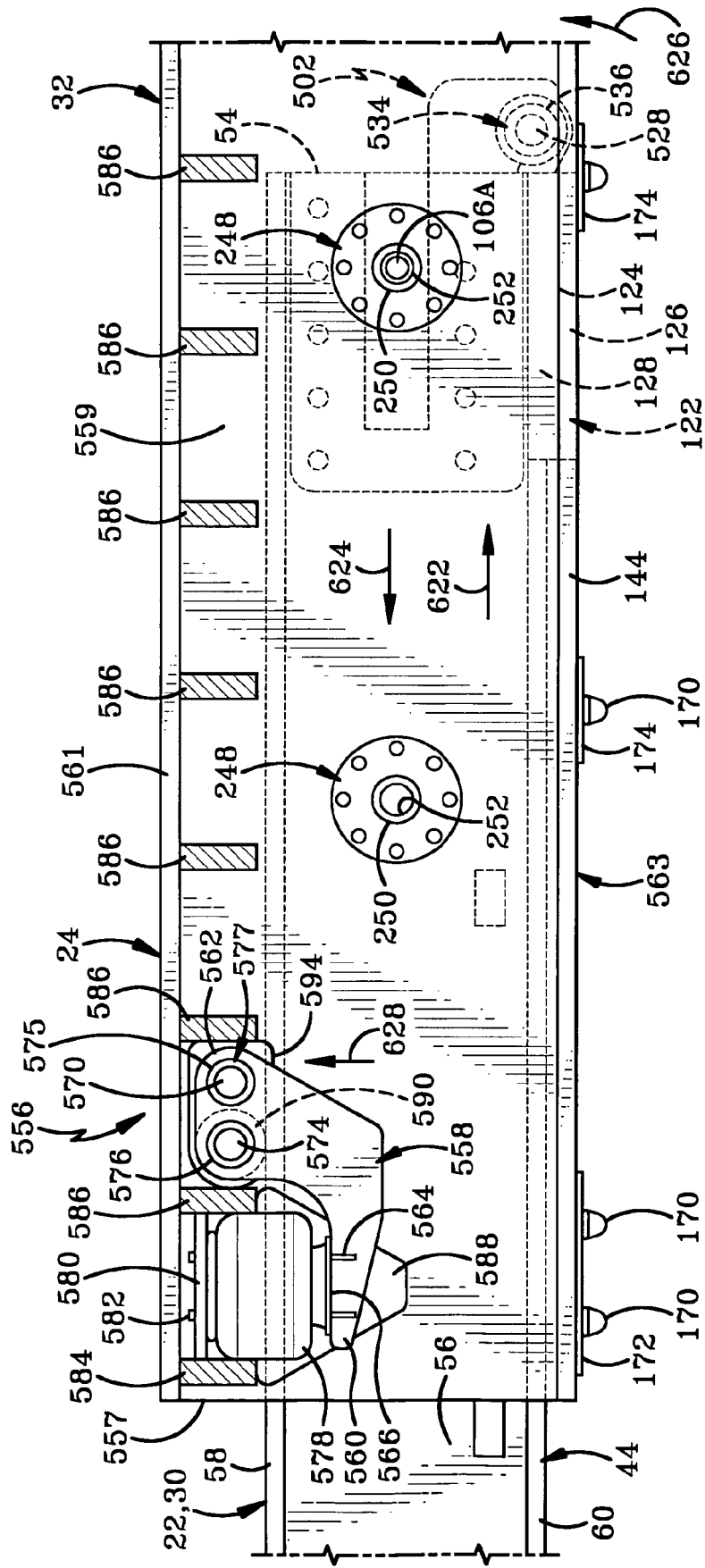

US 7,845,700 B2

EXTENDABLE TRAILER HAVING A ROLL SUPPORT ASSEMBLY

CROSS-REFERENCE TO RELATED APPLICATIONS

This is a continuation-in-part application claiming priority to Standard Utility patent application Ser. No. 12/070,450, filed Feb. 19, 2008, now U.S. Pat. No. 7,677,625 claiming priority from U.S. Provisional Application Ser. No. 61/008, 745, filed Dec. 21, 2007, the entire disclosures of which are incorporated herein by reference.

BACKGROUND OF THE INVENTION

1. Technical Field

The present invention relates generally to large transport vehicles. More particularly, the present invention relates to trailers used with such vehicles. Specifically, the present invention relates to extendable flatbed trailers.

2. Background Information

Extendable flatbed trailers which have a retracted position providing for a standard length trailer such as used with a tractor trailer rig and an extended position for use in carrying extremely long loads are well known in the art. However, these extendable flatbed trailers are typically formed primarily of steel. As a result, these trailers are relatively heavy which as a result minimizes the weight of the load that may be carried on most roads due to weight limit regulations, in addition to increasing fuel usage. Furthermore, many truck operators use an extendable trailer in its extended configuration only a few times a year. Thus, when the extendable trailer is used in its retracted position, it weighs a great deal more than a standard length trailer. As a result, there is a need in the art for an extendable flatbed trailer which addresses these problems.

BRIEF SUMMARY OF THE INVENTION

The present invention broadly comprises an apparatus comprising a front flatbed trailer section, a rear flatbed trailer section, a first support assembly carried by one of the front and rear flatbed trailer sections, and wherein the first support assembly moves the front and rear flatbed trailer sections axially relative to each other from a first position to a second position.

The present invention also broadly comprises a method of extending a trailer comprising the steps of providing a first flatbed trailer section and a second flatbed trailer section with a slide member and a first support assembly, displacing the first support assembly in a first direction, separating the first and second flatbed trailer sections in a vertical direction, and moving one of the first and second flatbed trailer sections in a horizontal direction relative to the other of the first and second flatbed trailer sections.

BRIEF DESCRIPTION OF THE DRAWINGS

FIG. 1 is a side elevational view of a first embodiment of the extendable flatbed trailer of the present invention shown in a fully extended configuration carrying an extended length load and hitched to a tractor to form an 18-wheel tractor trailer rig.

FIG. 2 is a top plan view of the first embodiment in the fully extended position.

FIG. 3 is a side elevational view of the front flatbed section of the first embodiment.

FIG. 6 is a sectional view taken on line 6-6 of FIG. 3 showing the locking pins in the locked position and the pneumatic actuators.

FIG. 7 is an enlarged side elevational view of the rear flatbed section of the first embodiment.

FIG. 8A is a sectional view taken on line 8A-8A of FIG. 8.

FIG. 16 is similar to FIG. 14 and shows the front section slide further rearwardly relative to the position of FIG. 13 with the locking pins in their locking position within the respective eyelets.

FIG. 18 is a sectional view taken on line 18-18 of FIG. 16 illustrating that the heads of two of the bolts of the reinforcing plates are flush with the inner surface of the inner reinforcing plate so that the locking pin slides over the heads of the two bolts as illustrated in phantom lines.

FIG. 19 is similar to FIG. 1 and shows the flatbed trailer in an intermediate degree of extension with a load which is shorter than that shown in FIG. 1.

FIG. 22 is a side elevational view similar to FIG. 1 showing the second embodiment in a fully extended position.

FIG. 23 is similar to FIG. 20 and shows the second embodiment in its fully retracted position with a container to provide its box trailer configuration.

FIG. 24 is an exploded side elevational view of a third embodiment of the flatbed trailer of the present invention.

FIG. 25 is similar to FIG. 22 and shows the third embodiment in its fully extended configuration.

FIG. 47 is side elevational view of the rear flatbed section being slide away from the front flatbed section.

Similar numbers refer to similar parts throughout the drawings.

DETAILED DESCRIPTION OF THE PREFERRED EMBODIMENT

Figure 20:
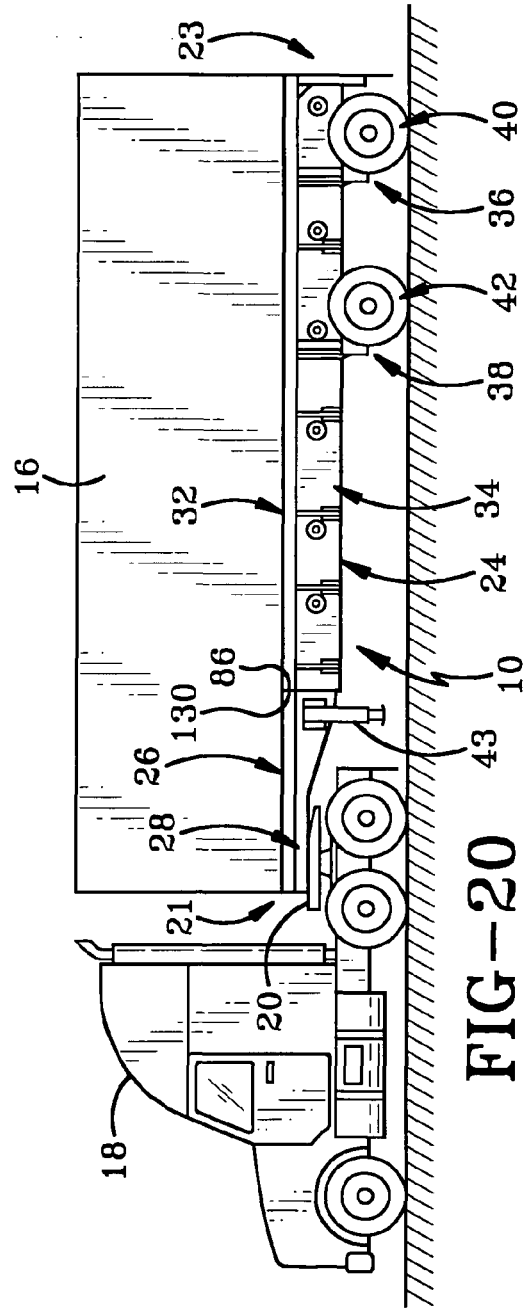
FIG. 20 is similar to FIG. 19 and shows the first embodiment of the flatbed trailer in the fully retracted position with a standard size container secured atop the flatbed whereby the truck is used in the configuration of a box trailer or van trailer.
Figure 21:
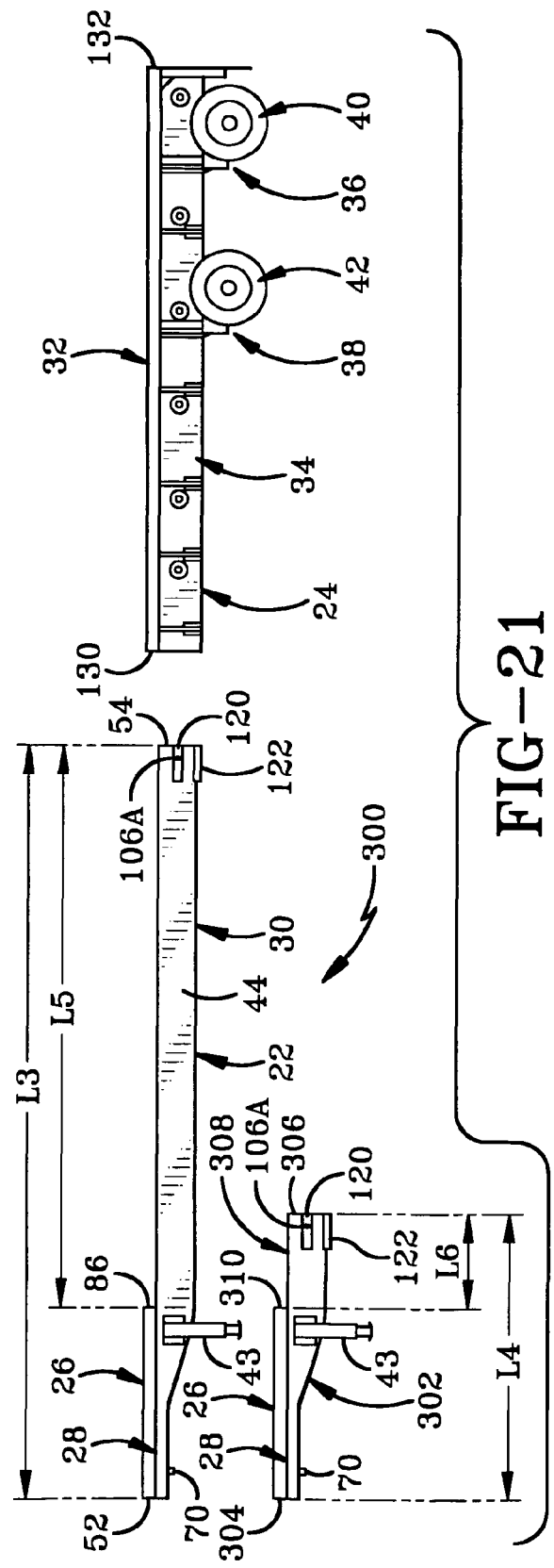
FIG. 21 is an exploded side elevational view of a second embodiment of the flatbed trailer of the present invention.

A first embodiment of the extendable flatbed trailer of the present invention is indicated generally at 10 in FIG. 1 shown mounted on a tractor; a second embodiment of the present invention is indicated generally at 300 in FIG. 21; and a third embodiment of the present invention is indicated generally at 400 in FIG. 24. Trailer 10 is extendable to a fully extended position shown in FIG. 1 and retractable to a fully retracted position shown in FIG. 20 with various degrees of retraction or extension, such as indicated by the partially extended position of FIG. 19. Trailer 10 is thus configured to carry a long load 12 in the fully extended position of FIG. 1, an intermediate length load 14 in the partially extended position of FIG. 19 and a shorter load or container 16 in the fully retracted position shown in FIG. 20. Loads 12 and 14 are typically such items as very long I-beams, pipes or the like. Container 16 is typically the standard size container used with a tractor trailer rig in a box trailer or van trailer configuration. Trailer 10 is shown in FIG. 1 hitched to a towing vehicle in the form of a tractor so that tractor 18 and trailer 10 form an 18-wheel tractor trailer rig suitable for driving on various roadways. Tractor 18 includes a hitch assembly in the form of a fifth wheel including a fifth wheel hitch plate 20 serving as the hitch member of tractor 18 although other hitch members may be used with trailer 10.

In accordance with the invention, trailer 10 is formed primarily of aluminum and has front and rear ends 21 and 23 defining therebetween a longitudinal direction of trailer 10, and first and second sides 25 and 27 defining therebetween an axial direction of trailer 10. Trailer 10 includes front and rear flatbed sections 22 and 24 which are moveable longitudinally relative to one another to provide the various degrees of extension and retraction of trailer 10. Front section 22 includes a front or first deck section 26, a hitch section 28 connected to the bottom of deck section 26 and a male connecter extension 30 connected to the bottom of deck section 26 and the rear of hitch section 28 and extending rearwardly of deck section 26. Deck section 26 defines a front portion of the upper surface of trailer 10 on which load 12 is seated. Hitch section 28 is configured to hitchably engage plate 20 for hitching trailer 10 to tractor 18. Extension 30 is configured for connection to rear flatbed section 24 as described in greater detail below. Rear flatbed section 24 includes an upper deck section 32 defining an upper surface of trailer 10 on which a part of load 12 may be seated and a female receiver section 34 connected to and extending downwardly from deck section 32 and providing support to deck section 32. A rear suspension assembly is provided adjacent rear 23 of trailer 10 and a forward suspension assembly 38 is spaced forward of rear suspension assembly 36 while still being generally adjacent rear 23. A set of rear wheels 40 and a set of forward wheels 42 are rotatably mounted respectively on rear suspension 36 and forward suspension 38 to support trailer 10 and allow it to roll in forward and rearward directions. A landing gear 43 is provided adjacent the rear of deck section 26 and generally adjacent the front of trailer 10 although landing gear 43 may not be formed primarily of aluminum materials.

Front flatbed section 22 is now described in greater detail with reference to FIGS. 2-6. Front section 22 includes a primary longitudinal structure comprising first and second aluminum primary structural rails 44 and 46 which are parallel to one another along with a horizontal longitudinal upper plate 48 which extends between and is connected to rails 44 and 46 adjacent their upper ends and which extends from adjacent and forward of the rear of deck 26 all the way to the rear of extension 30, that is, to the rear ends of rails 44 and 46. In the exemplary embodiment, seven large weight-reducing circular through holes 50 are formed in upper plate 48 extending from its top to its bottom surface and having a diameter greater than half the width of plate 48. Holes 50 are longitudinally evenly spaced from one another and are longitudinally aligned, with the front hole 50 adjacent the front of plate 48 and the rear hole 50 adjacent the rear of plate 48. Rails 44 and 46 extend from a front end 52 to a rear end 54 which are substantially the same as the front and rear ends of front section 22. Each of rails 44 and 46 is typically formed of an I-beam comprising a vertical web 56, a top horizontal crossbar 58 and a bottom horizontal crossbar 60. Bottom crossbar 60 tapers upwardly adjacent the rear of deck 26 at a tapered segment 62 and then levels off in an upper horizontal segment 64 which is thus spaced upwardly of a lower horizontal segment 66 which extends rearwardly from the rear end of tapered segment 62. Web 58 tapers accordingly so that rails 44 and 46 adjacent front end 52 provide an elevated upper horizontal segment 64 for the attachment of a flat generally horizontal hitch plate 68 which is welded to the bottom of segment 64. A hitch member 70 is secured to hitch plate 68 and extends downwardly therefrom and is configured to be received within the standard notch (not shown) of hitch plate 20 of tractor 18 and secured therein in order to hitch trailer 10 to tractor 18. It is noted that unless otherwise specified the various references to welds or welding in the present application are in the preferred embodiment aluminum welds which are suitable for welding two aluminum parts to one another. Eight axial cross structures 72 extend between and are connected to rails 44 and 46 and are longitudinally spaced from one another with the front structure 72 adjacent and behind deck 26 and the rear structure 72 adjacent rear end 54. The remainder of structures 72 are typically disposed between respective adjacent pairs of holes 50 formed in plate 48. Three of structures 72 are also shown in FIG. 5.

Each structure 72 is described in greater detail with referenced to FIG. 6. Each structure 72 includes an axially extending vertical upper plate 72 which extends between and connected to each of rails 44 and 46. More particularly, each plate 74 is welded to the respective webs 56 and the inner portion of top crossbars 58 and extends downwardly from crossbar 58 about ⅓ of the distance of the height of the each web 56. A pair of aluminum braces 76A and B are connected to aluminum plate 74 and angle downwardly in generally opposite directions to mount adjacent the lower ends of webs 56 of respective rails 44 and 46. More particularly, each brace 76 is an aluminum tube having opposed crimped or flattened ends 78. An aluminum mounting bracket 80 is secured to the inner surface of each web 56 adjacent its lower end by a plurality of fasteners 82 which in the exemplary embodiment include a threaded bolt and a threaded nut which threadedly engages the bolt with a pair of washers respectively abutting the head of the bolt and nut. While other fasteners may be utilized, the bolt and nut type fasteners are generally preferred to allow for removability of the various components of the trailer which are connected by such fasteners. Thus, fasteners represented at 82 throughout the present description generally have this configuration unless otherwise noted although the specific size of bolts, nuts and washers may be different at various locations on trailer 10. Thus, brace 76A is connected to plate 74 via a fastener 82 extending through holes formed in plate 74 and the upper crimped end 78 of brace 76A while the lower end 78 of brace 76A is likewise secured to mounting bracket 84 of rail 44 via a fastener 82 extending through similar holes. Brace 76A is secured to the front of plate 74 while bracket 76B is secured to the rear of plate 74 at a location such that brace 76A and B cross one another as viewed in the longitudinal direction. Each brace 76 thus forms a triangular configuration with plate 74 and one of rails 44 and 46.

Figure 4:
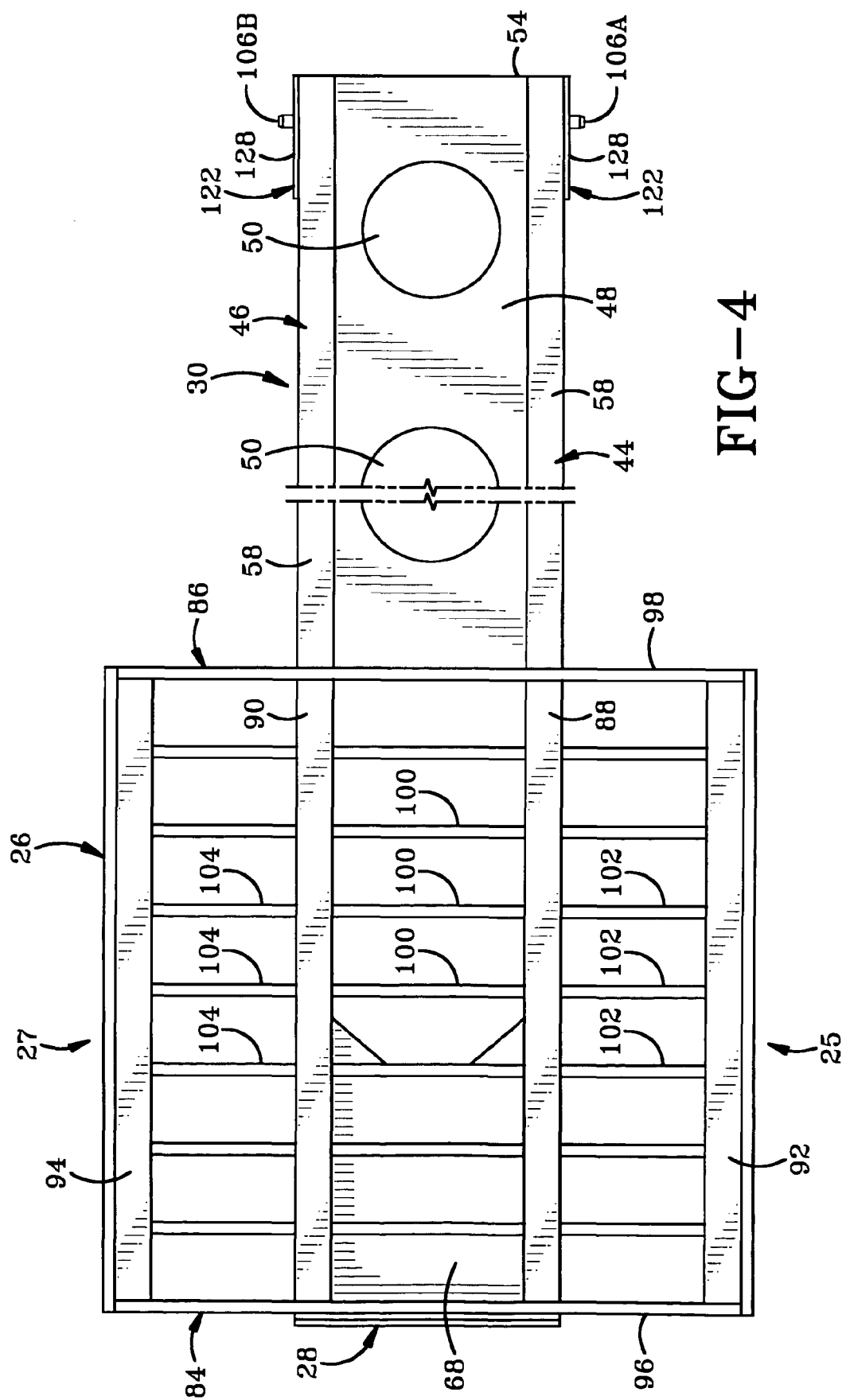
FIG. 4 is an enlarged top plan view of the front flatbed section with portions cut away taken on line 4-4 of FIG. 3.
Figure 5:
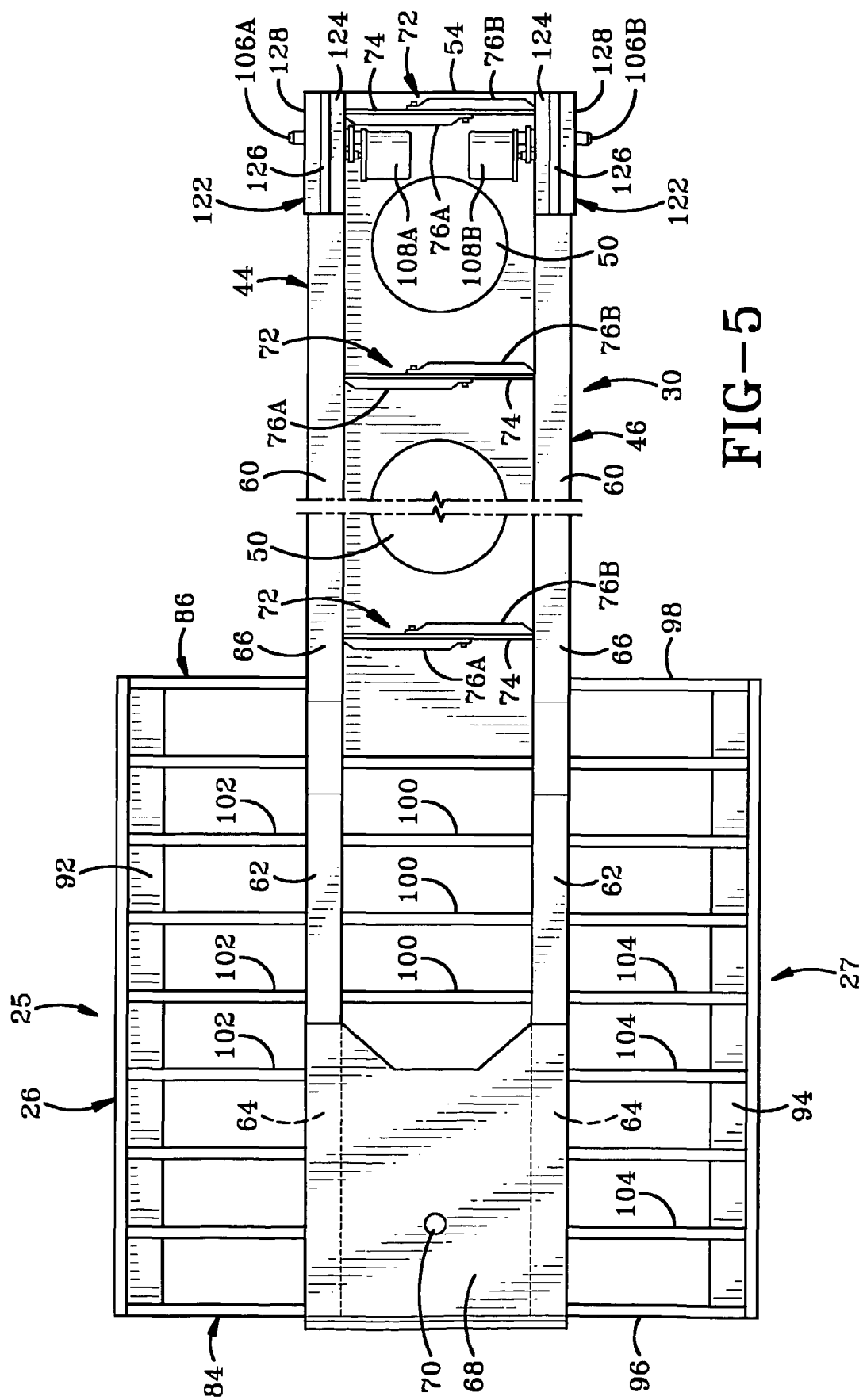
FIG. 5 is an enlarged bottom plan view of the front flatbed section with portions cut away taken on line 5-5 of FIG. 3.

Referring now to FIGS. 3-5, deck 26 is described in greater detail. Deck 26 has front and rear ends 84 and 86 and extends axially outwardly respectively beyond rails 44 and 46 to sides 25 and 27. Deck 26 includes first and second longitudinal upper main rails 88 and 90 which are connected to and extend upwardly respectively of rails 44 and 46 and are typically welded thereto. Rails 88 and 90 extend from adjacent front end 84 to adjacent rear end 86. Deck 26 further includes first and second longitudinal upper side rails 92 and 94 which are respectively spaced axially outwardly from main rails 88 and 90 and parallel thereto. Side rails 92 and 94 are typically in the form of an angle having an upper horizontal leg and a vertical leg extending downwardly therefrom to define the respective sides 25 and 27 of deck 26. A front axial rail 96 extends perpendicular to and is connected to the front ends of main rails 88 and 90 and side rails 92 and 94. A rear axial rail 98 extends parallel to rail 96 and is welded to the rear ends of main rails 88 and 90 and side rails 92 and 94. A plurality of parallel axial deck rails are evenly longitudinally spaced from one another, parallel to front and rear rails 96 and 98 and comprise respective central axial deck rails 100, first lateral axial deck rails 102 and second lateral axial deck rails 104 shown respectively aligned in a linear fashion. Each central axial deck rail 100 extends between and is welded to main rails 88 and 90. Each first lateral axial deck rail 102 extends between and is welded to main rail 88 and first side rail 92. Likewise, each second lateral axial deck rail 104 extends between and is welded to main rail 90 and second side rail 94. In the exemplary embodiment there are seven of each of rails 100, 102 and 104. All of the rails of deck 26 are formed of aluminum.

With reference to FIGS. 4-6, the structure adjacent rear end 54 of front flatbed section 22 is now described. A securing or locking mechanism is mounted on rails 44 and 46 adjacent rear end 54 and includes a pair of axially moveable locking pins 106A and 106B. Locking pins 106 are pneumatically moveable in an inward axial direction from a locked position shown in FIGS. 4-6 to an unlocked position shown in FIG. 12 by a pair of pneumatic cylinders 108A and B. Each cylinder 108 includes an internal spring which spring biases the respective locking pin 106 to its locked position. Each cylinder 108 is connected by tubing (not shown) to a source of compressed air (not shown). In the exemplary embodiment, each locking pin 106 and cylinder 108 is mounted on a respective one of rails 44 and 46 via a mounting bracket which comprises a generally square longitudinal tube 110, a collar 112 secured to and axially inward of tube 110, and a mounting plate 114 secured to and axially inward of collar 112. A through passage extends through each of the spaced sidewalls of tube 110, collar 112 and mounting plate 114 and receives the respective pin 106 to allow it to move axially between the locked and unlocked positions. An axial guide rod 116 is longitudinally offset from and parallel to each pin 106 and includes a threaded portion which is threadably engaged by a pair of nuts 118 to mount rod 116 on plate 114.

A longitudinal slide member 120 is secured to the outer surface of the outer sidewall of tube 110 and is typically formed of a thermoplastic material most preferably having a high lubricity indicative of a low coefficient of friction. Slide member 120 is typically formed of a fluorinated polymer such as polytetrafluoroethylene (PTFE), perfluoroalkoxy (PFA) and fluorinated ethylene propylene (FEP), all of which are sold under the brand name Teflon®. Another slide member 122 formed of the same material as slide member 120 is connected to the bottom of bottom crossbar 60 of each of rails 44 and 46. Slide member 122 includes a horizontal base portion 124, a downward extension 126 connected to and extending downwardly from base portion 124 and an upwardly extending leg 128 connected to the outer end of base 124 and extending upwardly therefrom in abutment with the outer edge of bottom crossbar 60. Leg 128 is spaced laterally outwardly from projection 126. Projection 126 and base member 124 together form a generally T-shaped member while base member 124 and leg 128 form a generally L-shaped configuration.

Referring to FIGS. 7-11, rear flatbed section 24 is described in greater detail. Rear section 24 has a front end 130 and a rear end 132 defining therebetween a length which is approximately the same as or similar to the length of connector extension 30 of front section 22. Second deck 32 of rear section 24 extends from first side 25 to second side 27 and thus has a width which is typically equal to that of front deck 26. In short, rear section 24 forms a large longitudinal beam defining a central longitudinal receiving passage 134 (FIG. 10) extending from front end 130 to adjacent rear end 132 for slidably receiving therein connector extension 30. Rear section 34 includes first and second longitudinal parallel structure rails 136 and 138 extending from adjacent front end 130 to adjacent rear end 132 and bounding passage 134. Each of rails 136 and 138 is in the form of and I-beam including a vertical flat plate or web 140, a horizontal top crossbar 142 connected to the top of web 140 and a horizontal bottom crossbar 144 connected to the bottom of web 140. The inner vertical surfaces of web 140 face axially inward toward one another to bound passage 134.

Figure 9:
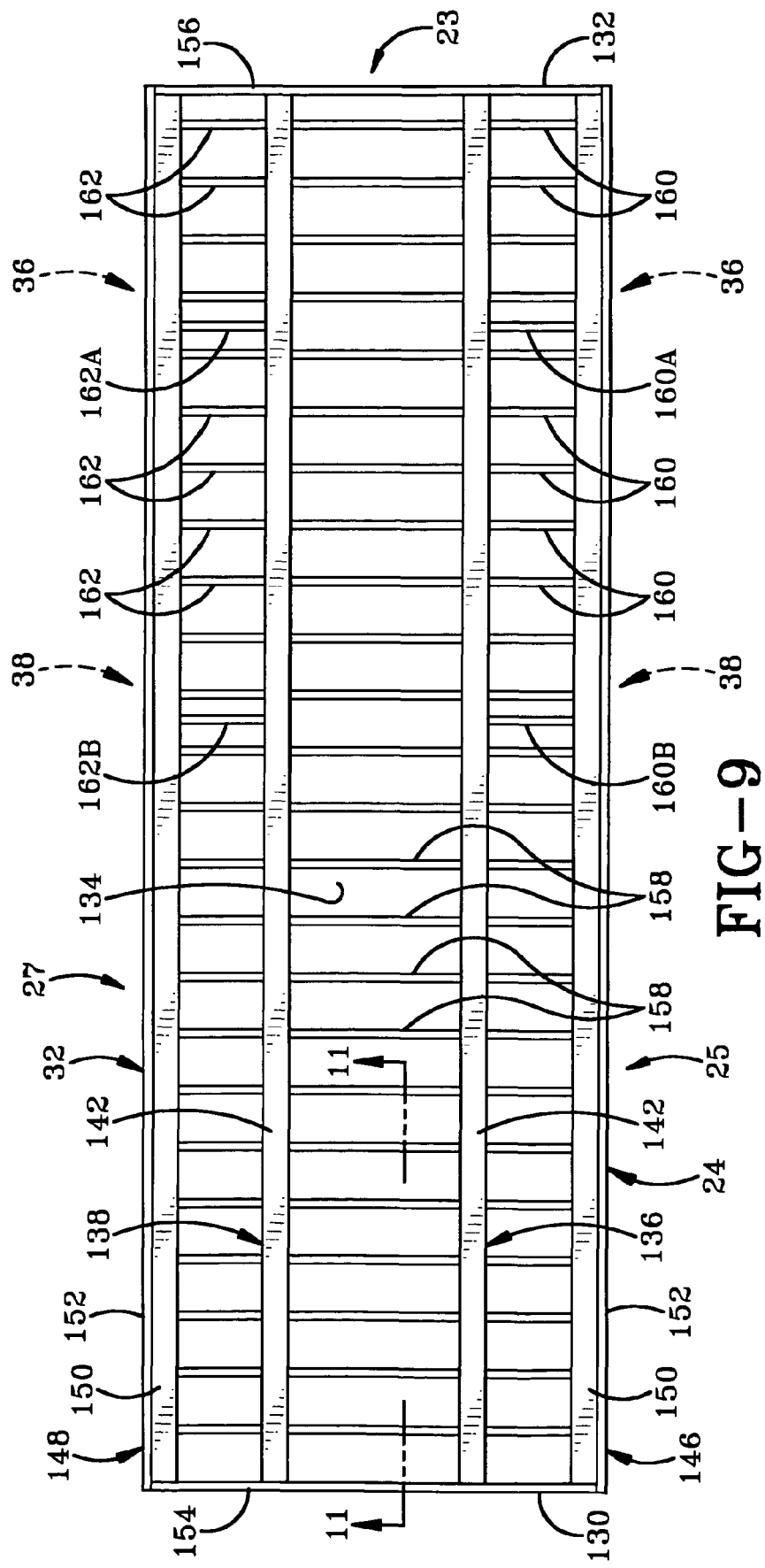
FIG. 9 is an enlarged top plan view of the rear flatbed section of the first embodiment taken on line 9-9 of FIG. 7.

Referring to FIG. 9, rear deck 32 includes first and second parallel upper side rails 146 and 148 spaced axially outwardly respectively of primary rails 136 and 138 and are parallel thereto. Upper side rails 146 and 148 are longer than upper side rails 92 and 94 of front deck 26 but have the same angle or L-shaped configuration and thus each includes an upper horizontal leg 150 and a vertical leg 152 connected to the outer edge of leg 150 and extending perpendicularly downwardly therefrom. Deck 32 further includes front and rear axial rails 154 and 156 respectively connected to the front and rear ends of rails 136, 138, 146 and 148 and extending from adjacent first side 25 to second side 27. Front axial rail 154 extends downwardly only about ¼ of the height of webs 140 from top crossbar 142 while rear axial rail 156 extends downwardly from top crossbar 142 below bottom crossbar 144 (FIG. 7) and is thus a relatively large flat rectangular tail plate. A mudflap 157 is connected to and extends downwardly from the lower end of rear rail 156 and is formed of rubber or another flexible sheet of material. Deck 32 further includes twenty-four longitudinally spaced parallel axial deck rails which are equally spaced from one another along the length of rear section 24 and include central axial deck rails 158, and first and second lateral axial deck rails 160 and 162 aligned respectively with central deck rails 158. Each central deck rail 158 extends between primary rails 136 and 138 adjacent their upper ends and is welded to the upper portion of each web 140 and the inwardly extending portion of top crossbars 142. The lower surfaces of central deck rails 158 form an upper boundary of passage 134, which is free of cross members below rails 158 and above the lower surfaces of bottom crossbars 144 which extend from first rail 136 to second rail 138. Each first lateral deck rail extends from first primary rail 136 to first upper side rail 146 and is welded to the upper portion of web 140 and the outwardly extending portion of top crossbar 142 as well as to legs 150 and 152 of upper side rails 146. Likewise, each second axial side rail 162 extends from adjacent of upper end of second primary rail 138 to second upper side rail 148 and is welded to each in the same manner as deck rails 160. There are also a pair of first lateral deck rails 160A and 160B each positioned generally midway between a respective pair of adjacent deck rails 160 and respectively adjacent rear suspension assembly 36 and forward suspension assembly 38. Likewise, there are a pair of second lateral axial deck rails 162A and 162B axially aligned with first deck rails 160A and 160B and thus also respectively adjacent rear suspension assembly 36 and forward suspension assembly 38.

Figure 10:
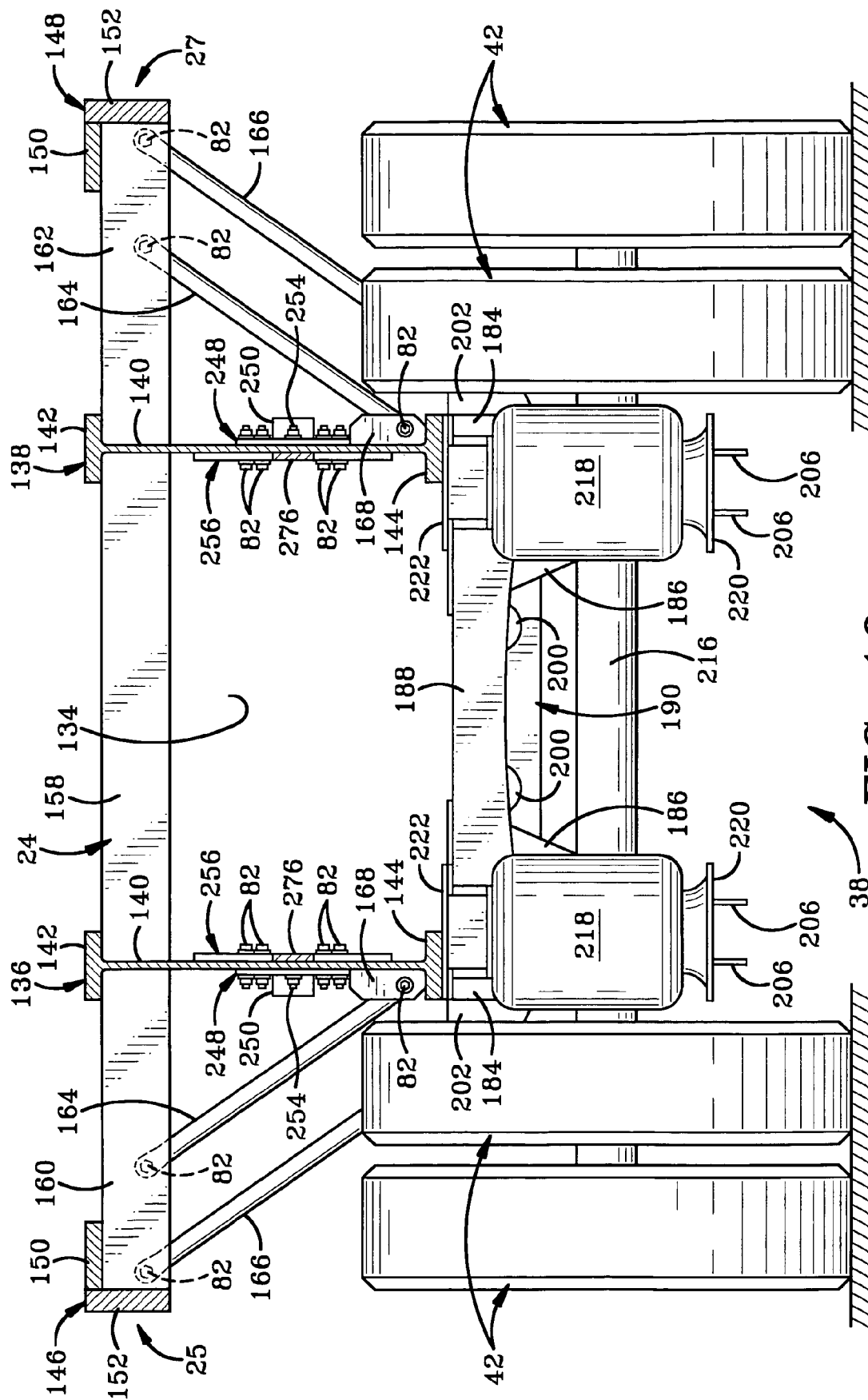
FIG. 10 is a sectional view taken on line 10-10 of FIG. 7 showing the suspension and related structure associated with the forward axle.

Multiple aluminum braces are mounted on primary beam 136 and 138 to provide additional strength to rear flatbed section 24. These braces include a first set of angled outer braces 164 and a second set of angled outer braces 166 wherein braces 164 and 166 are longitudinally spaced from one another along the length of rear flatbed section 24. In keeping with maintaining passage 134 free of obstructions, braces 164 and 166 are external to passage 134. Like braces 76 on front flatbed section 22, each of braces 164 and 166 is an aluminum tube with crimped or flattened ends with holes formed therein for receiving fasteners. As shown in FIG. 7, there are five braces 164 in the first set and two braces 166 in the second set. FIG. 7 shows the first and second sets of braces 164 and 166 which are mounted on first primary rail 136. While the figures do not show all the analogous angled outer braces on the other side of the trailer which are mounted on second rail 138, each side of rear flatbed section 24 is substantially a mirror image of the other with respect to a vertical longitudinally extending plane at the center of section 24 and thus there are analogous sets of outer braces 164 and 166 on the opposite side of rear section 24. FIG. 10 shows one each of braces 164 and 166 which are mounted along second side 27. Five longitudinally spaced aluminum mounting brackets 168 are connected to the outer surface of the lower portion of web 140 via fasteners 82 for mounting the lower end of each outer brace 164 via a fastener 82. Each brace 164 angles upwardly and axially outwardly from its bracket 168 to an upper end which is connected to a respective one of lateral deck rails 160 via a respective fastener 82. Braces 166 are connected in a similar way described further below.

Figure 12:
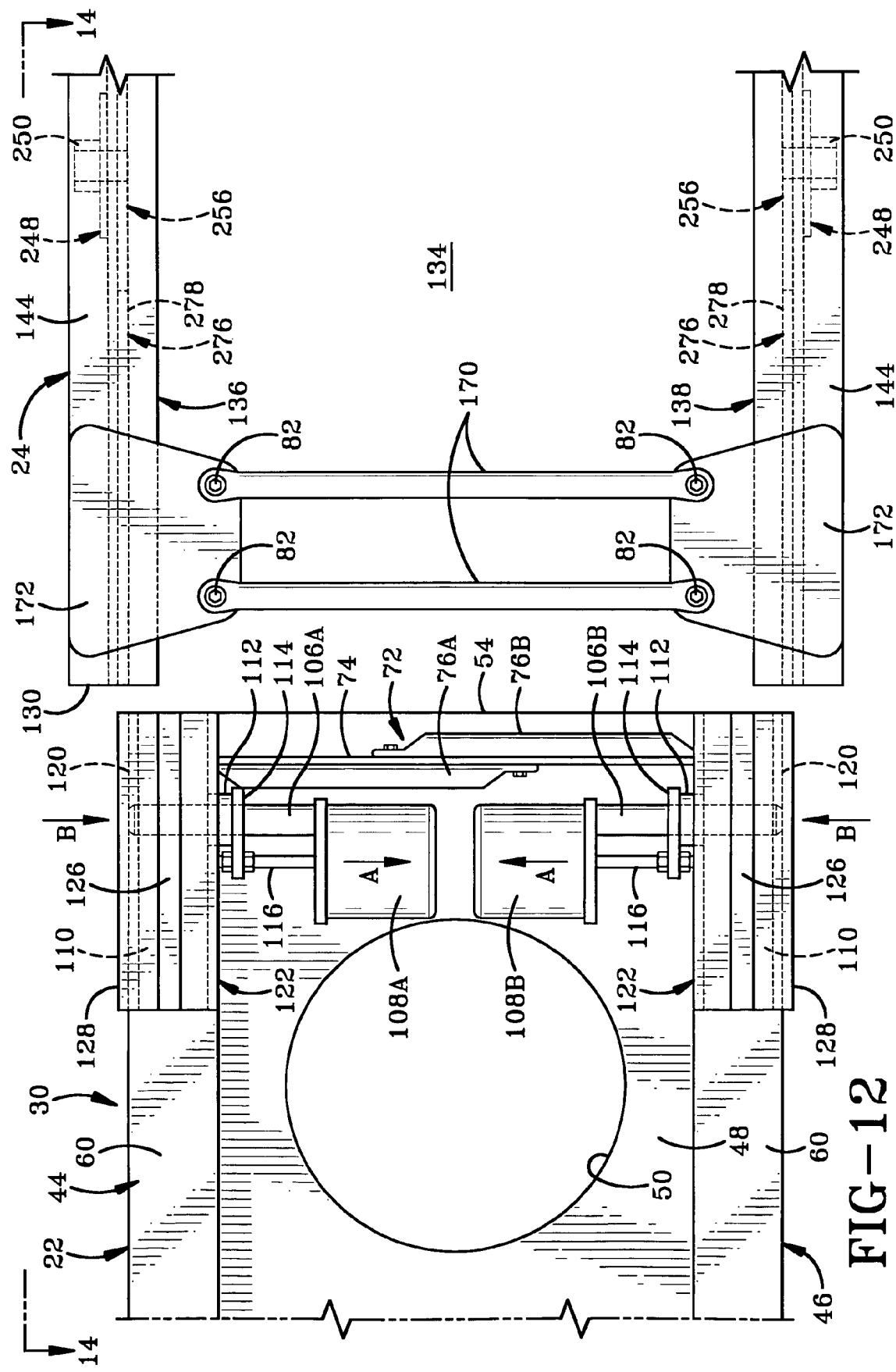
FIG. 12 is an enlarged bottom plan view with portions cut away showing the rear end of the front flatbed section and the front end of the rear flatbed section adjacent one another prior to their engagement and connection to one another and showing the locking pins having moved inwardly toward one another to the unlocked position.

In addition, six aluminum axial horizontal braces 170 (FIG. 7) extend between and are connected to the bottom rails 136 and 138. Five of these braces 170 are disposed directly below respective mounting brackets 168 and are substantially aligned with respective outer angled braces 164. Braces 170 are parallel to one another and perpendicular to rails 136 and 138. Like the braces discussed above, braces 170 are aluminum tubes with crimped or flattened ends. A front mounting bracket 172 in the form of a flat trapezoidal plate is mounted on each of rails 136 and 138 as best shown in FIG. 12. More particularly, plates 172 are horizontal and welded to the lower surfaces of the bottom crossbars 144 of the respective rails 136 and 138 and extend inwardly therefrom toward one another. A pair of axial braces 170 extend between and is connected to the inward extension of brackets 172 by respective fasteners 82, which pass through holes formed in the crimped ends of braces 172 and holes formed in plates 172. The remainder of braces 170 are secured in a similar fashion to bottom crossbars 144 via respective mounting brackets 174 which are similar to brackets 172 except that they are somewhat smaller due to the fact that only a single brace 170 extends between the respective pair mounted on rails 136 and 138. Braces 170 and brackets 172 and 174 are disposed entirely below the bottom surfaces of bottom crossbars 144 to keep passage 134 clear.

Figure 8:
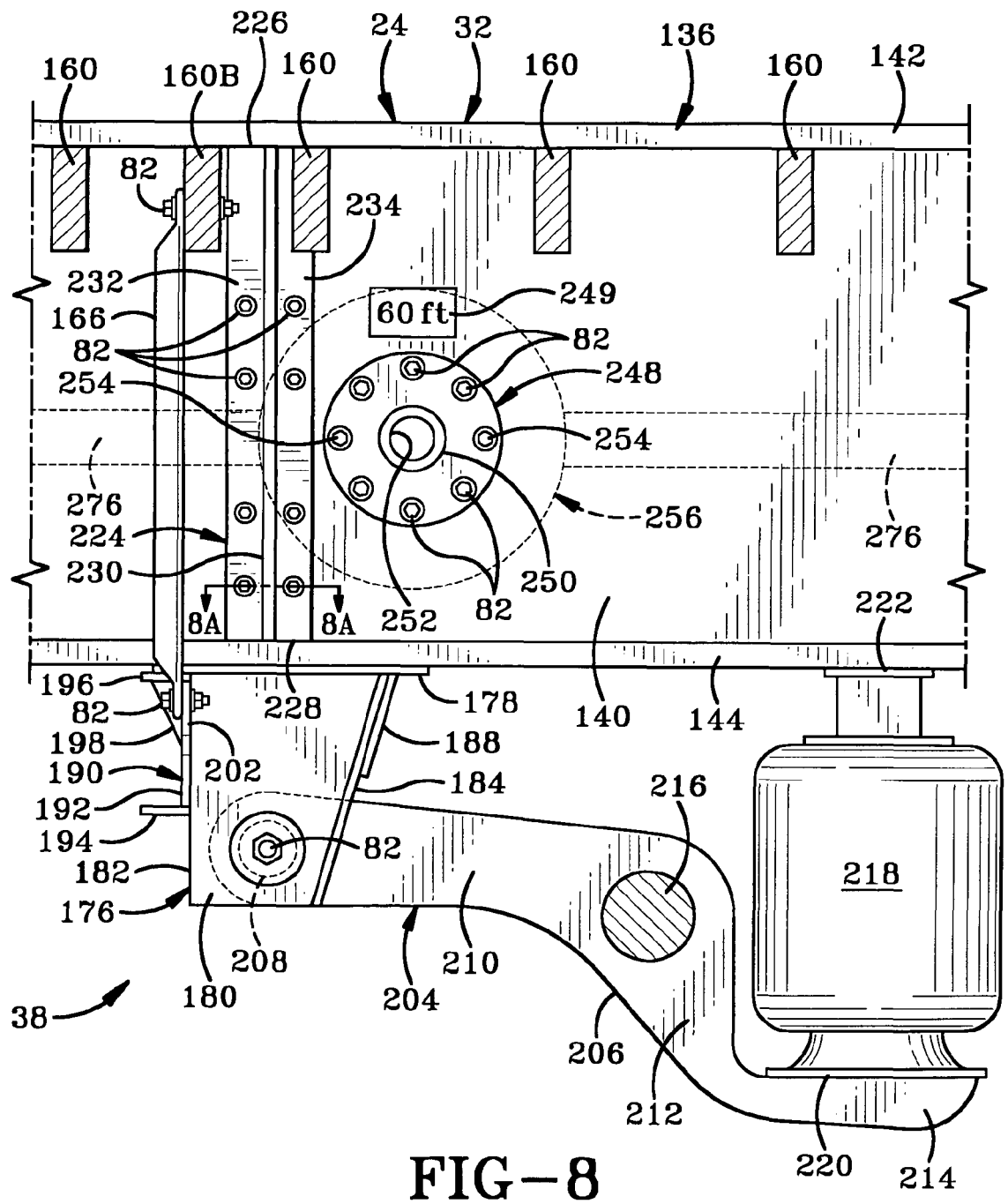
FIG. 8 is a sectional view taken on line 8-8 of FIG. 2 in the suspension area associated with the forward axle of the trailer showing one of the air springs, an outer reinforcing plate of one of the eyelets, a vertical web strengthener and an outer angled brace.

Referring to FIGS. 8 and 10, suspension assembly 38 and the mounting of outer angled brace 166 is described. Suspension assemblies 36 and 38 are substantially identical and thus only assembly 38 is described. Suspension assemblies 36 and 38 are disposed below bottom crossbars 144 to keep passage 134 clear. A typically steel box-shaped hanger 176 is mounted on and extends downwardly from each bottom crossbar 144 of respective rails 136 and 138. Each hanger 176 includes a flat horizontal top wall or flange 178 which is secured to the bottom of bottom crossbar 144. Hanger 176 further includes a pair of axially spaced trapezoidal sidewalls 180 (one shown) which are connected to and extend downwardly from top wall 178. A rectangular front wall 182 is connected to and extends downwardly from top wall 178 and also extends between and is connected to sidewalls 180. A rear wall 184 likewise is connected to top wall 178 and extends downwardly therefrom and also extends between and is connected to the rear of sidewalls 180 and angles upwardly and rearwardly. As shown in FIG. 10, each rear wall 184 includes a flat triangular flange portion 186 which angles axially inwardly and upwardly. A typically steel rear axial cross member 188 is connected to and extends between rear walls 184 of the respective hangers 176 and is in the form of a flat plate. A typically steel front axial cross member 190 in the form of a U-shaped channel is connected to and extend between front walls 182 of the respective hanger 176. Front cross member 190 includes a vertical axially elongated base member or plate 192, a horizontal bottom plate 194 connected to and extending forward from the bottom of base plate 192, a top horizontal plate 196 connected to-and extending forward from the top of base plate 192 and a plurality of triangular braces 198 connected to top plate 196 and the upper portion of base plate 192. FIG. 10 shows a pair of through holes 200 formed in base plate 192. Base plate 192 includes a pair of lateral extensions 202 on its opposed ends which extend outwardly beyond bottom and top plates 194 and 196 and beyond bottom crossbar 144 of the respective rails 136 and 138. Each outer angled brace 166 is secured at its bottom end to one of lateral extensions 202 and at its top end to one of lateral axial deck rails 160B and 162B, the latter being shown in FIG. 9. The rearmost pair of outer angled braces 166 (FIG. 7) are respectively connected at their upper ends to deck rails 160A and 162A (FIG. 9) in the same manner although this is not specifically shown. A pivot arm 204 is pivotally connected to each hanger 176 by fastener 82 and includes a pair of parallel axially spaced arm plates 206. A spacer 208 extends between arm plates 206 and defines a hole through which fastener 82 extends and serves as a pivot. Each arm plate 206 includes a first segment 210 which extends rearwardly from fastener 82 and the lower portion of hanger 176, a second segment 212 which extends downwardly from the trailing end of first segment 210 and a third segment 214 which extends rearwardly from the lower end of second segment 212. An axle 216 on which wheels 42 are rotatably mounted is connected to each arm 204 at the confluence between first and second segments 210 and 212 thereof. A shock absorber in the form of an air spring 218 is mounted atop third segment 214 via a bottom mounting plate 220 and extends upwardly to mount on the bottom of bottom crossbar 144 via a top mounting plate 222. Air springs 218 thus provide shock absorption during the pivotal movement of arms 204 in response to vertical movement of axle 216 and wheels 42 during various travel conditions of trailer 10.

Referring to FIGS. 7, 8 and 8A, two typically aluminum vertical web strengtheners 224 are connected to the outer vertical surface of web 140 respectively adjacent rear suspension assembly 36 and forward suspension assembly 38. More particularly, web strengtheners 224 are respectively directly above and adjacent hangers 176, and respectively adjacent and rearward of outer angled braces 166. As shown in FIG. 8, each web strengthener 224 has a top end 226 closely adjacent or abutting the lower surface of top crossbar 142 and a bottom end 228 closely adjacent or abutting the upper surface of bottom crossbar 144. Web strengthener 224 includes an upwardly extending central rib 230 which is connected to and extends perpendicularly axially outwardly from front and rear walls or wings 232 and 234 which are on either side of rib 230 and are substantially parallel to web 140. Central rib 230 extends from top end 226 to bottom end 228, as does front wing 232. Rear wing 234 includes a portion extending from top end 226 to bottom end 228 and a portion which is truncated and ends at the bottom of lateral deck rails 160 although rear wing 234 may in its entirety extend upwardly to upper end 226 depending on its specific location relative to deck rails 160. Eight fasteners 82, four on each side of central rib 230 secure web strengthener 224 to web 140 with the bolt shafts of fasteners 82 extending through respective holes 236 formed in wings 232 and 234 and holes 238 formed in web 140 and aligned with holes 236, as shown in FIG. 8A. The sectional view of FIG. 8A also shows that web strengthener 224 is a T-shaped structure and further includes front and rear longitudinally spaced walls or legs 240 and 242 which are connected to the outer ends of wings 232 and 234 and extend axially inwardly therefrom to abut the outer surface of web 140 so that wings 232 and 234 are spaced axially outwardly a short distance from the outer surface of web 140. FIG. 8A also shows that central rib 230 includes a pair of parallel axially extending rib walls 244 adjacent and spaced from one another, which extend axially outwardly from wings 232 and 234 to a terminal arcuate wall 246 connected to the outer ends of rib walls 244. Terminal wall 246 is adjacent the terminal ends or edges of top and bottom crossbars 142 and 144.

Referring to FIGS. 7 and 8, six longitudinally spaced eyelets are mounted on web 140 each including a flat circular outer reinforcing plate 248 secured to the outer vertical surface of web 140 and typically formed of steel. As shown in FIG. 7, the three front reinforcing plates 248 are respectively adjacent and forward of three of the outer angled braces 164 and the associated mounting brackets 168. The next reinforcing plate 248 rearward thereof is adjacent and rearward of the forward web strengthener 224 and directly above a portion of hanger 176. The next reinforcing plate 248 in the rearward direction is adjacent and behind one of angled braces 164 and the corresponding mounting bracket 168. The rearmost reinforcing plate 248 is rearward of the rear axle 216 and adjacent the rear end 132 of rear flatbed section 24. A typically steel tube or bushing 250 extends through a central opening formed in plate 248 and is typically cylindrical or oval in cross section. Bushing 250 extends axially outwardly from plate 248 (FIG. 10) as well as axially inwardly therefrom (FIG. 17) and defines an axially extending through passage 252. Six trailer length indicator labels 249 are secured to web 140 and respectively adjacent and above reinforcement plates 248. When locking pins 106 are received within respective passages 252, labels 249 are configured to indicate the length of trailer 10, for instance "60 feet" as indicated on label 249 in FIG. 8. As shown in FIG. 8, reinforcing plate 248 is secured to web 140 with eight fasteners, three upper fasteners 82, three lower fasteners 82, and two modified fasteners 254 which lie along a central horizontal plane between the upper three fasteners 82 and the lower three fasteners 82. Fasteners 254 are similar to fasteners 82 in that they include a bolt and nut for threadably engaging one another and a washer abutting the outer surface of reinforcing plate 248, but are modified as described further below.

Figure 11:
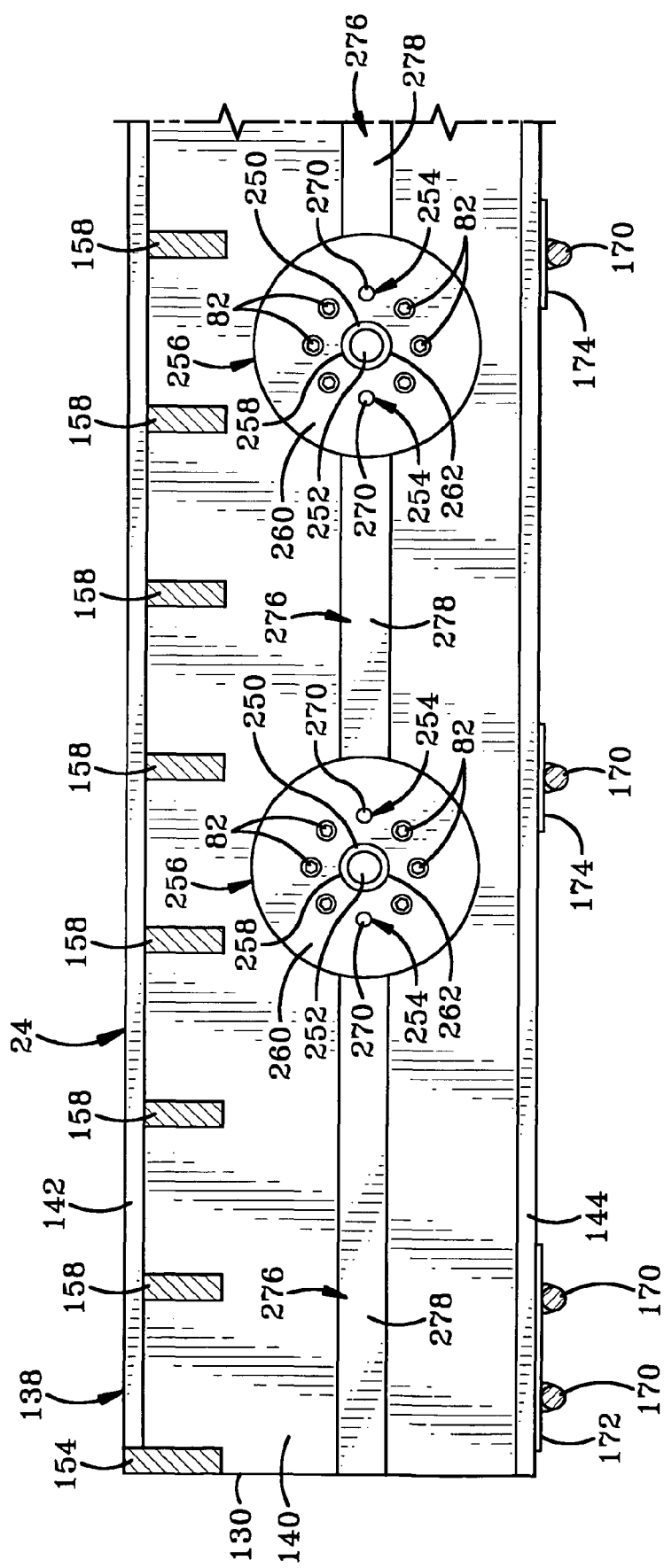
FIG. 11 is an enlarged sectional view taken on line 11-11 of FIG. 9 showing a pair of the inner reinforcing plates of the eyelets and the longitudinal wear bar.

With reference to FIGS. 8, 10 and 11, the eyelets on rails 136 and 138 further include circular inner reinforcing plates 256 which are typically formed of aluminum, have a larger diameter than and are concentric with outer reinforcing plates 248, and are typically welded to the inner vertical surface of web 140 of the respective rails 136 and 138. A hole 258 (FIG. 11) is formed in the center of plate 256 for receiving an inner end segment of bushing 250. Each plate has a flat inner surface 260 which is parallel to the inner surface of web 140 and spaced inwardly therefrom a short distance, for instance ¼ inch or so. Bushing 250 has an inner surface or end 262 which is flush with surface 260 or recessed relative thereto, that is, closer to the inner surface of web 140 than is surface 260, and thus preferably is no further from the inner surface of web 140 than is surface 260.

Returning to modified fasteners 254 and with reference to FIGS. 11 and 18, each of fasteners 254 includes a bolt having a threaded shaft 266 with an enlarged head 268, a nut threadably engaging shaft 266 and a washer abutting the nut and the outer surface of reinforcing plate 248. Head 268 has an inner surface or end 270 which is flush with or recessed relative to surface 260 of inner reinforcing plate 256. More particularly, shaft 26 extends through holes formed in outer reinforcing plate 248 and web 140, as well as a hole 272 formed in inner reinforcing plate 256 which includes a counterbore 274 in which head 268 is disposed. A plurality of wear bars 276 are also secured to the inner surface of web 140 each including an inner surface 278 which is spaced from the inner surface of web 140 and flush with inner surfaces 260 of the respective plates 256. Wear bars 276 are typically formed of aluminum or steel although another metal may be used. Wear bars 276 are typically welded to web 140 although any other suitable securing mechanism may be used whereby wear bars 276 are rigidly secured, either removably or non-removably from web 140. Wear bars 276 may be extruded as an integral part of each rail 136 and 138. Alternately, a track may be formed on each rail 136 and 138 in which the wear bars are slidably received. Each of wear bars 276 is a flat horizontal strip spaced from each of upper and lower crossbars 142 and 144. The front wear bar 276 extends from front end 130 of rear flatbed section 24 to the front of front inner reinforcing plate 256, and is thus typically in abutment with or closely adjacent the front of the front plate 256. The next wear bar 276 rearwardly thereof extends from the rear of the front reinforcing plate 256 to the front of the next reinforcing plate 256. The remainder of the wear bars 256 similarly extend between and are in abutment with or closely adjacent a respective adjacent pair of the inner reinforcing plates 256.

Figure 13:
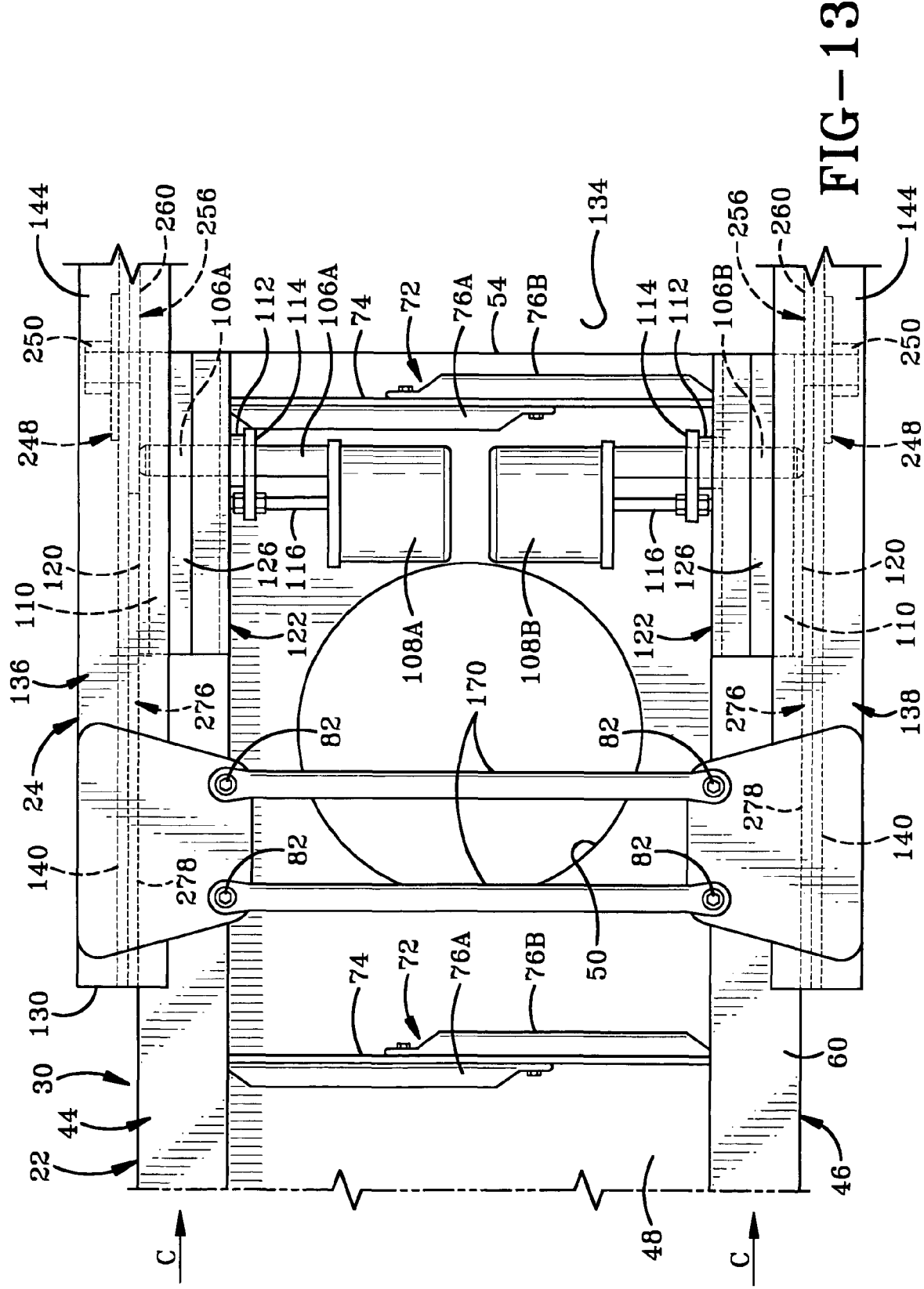
FIG. 13 is similar to FIG. 12 and shows the male connector extension of front section sliding into the female receiver of the rear section with the locking pins slidably engaging the wear bars and inner reinforcing plates.
Figure 14:
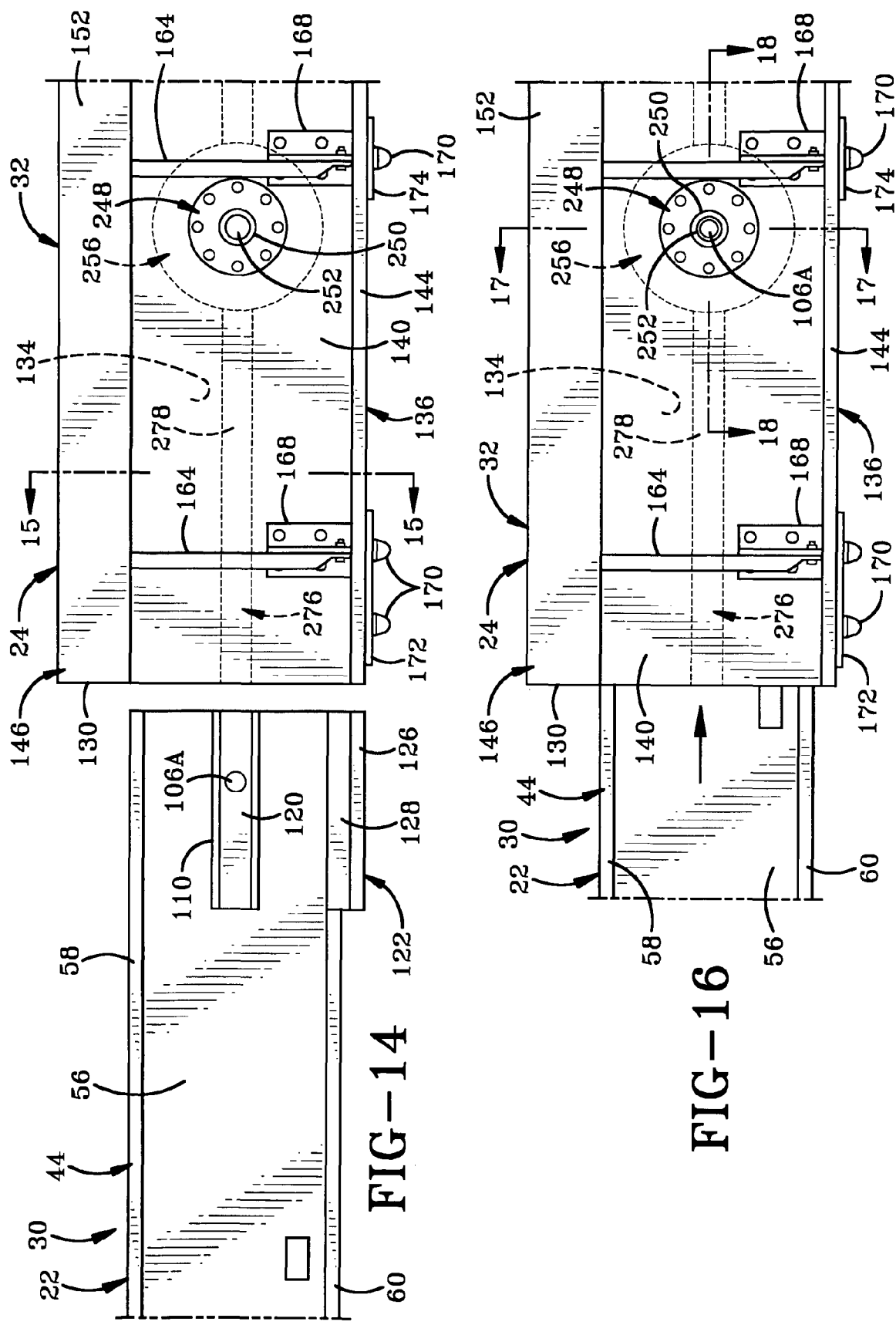
FIG. 14 is a side elevational view with portions cut away with the front and rear flatbed sections positioned relative to one another as shown in FIG. 12.
Figure 15:
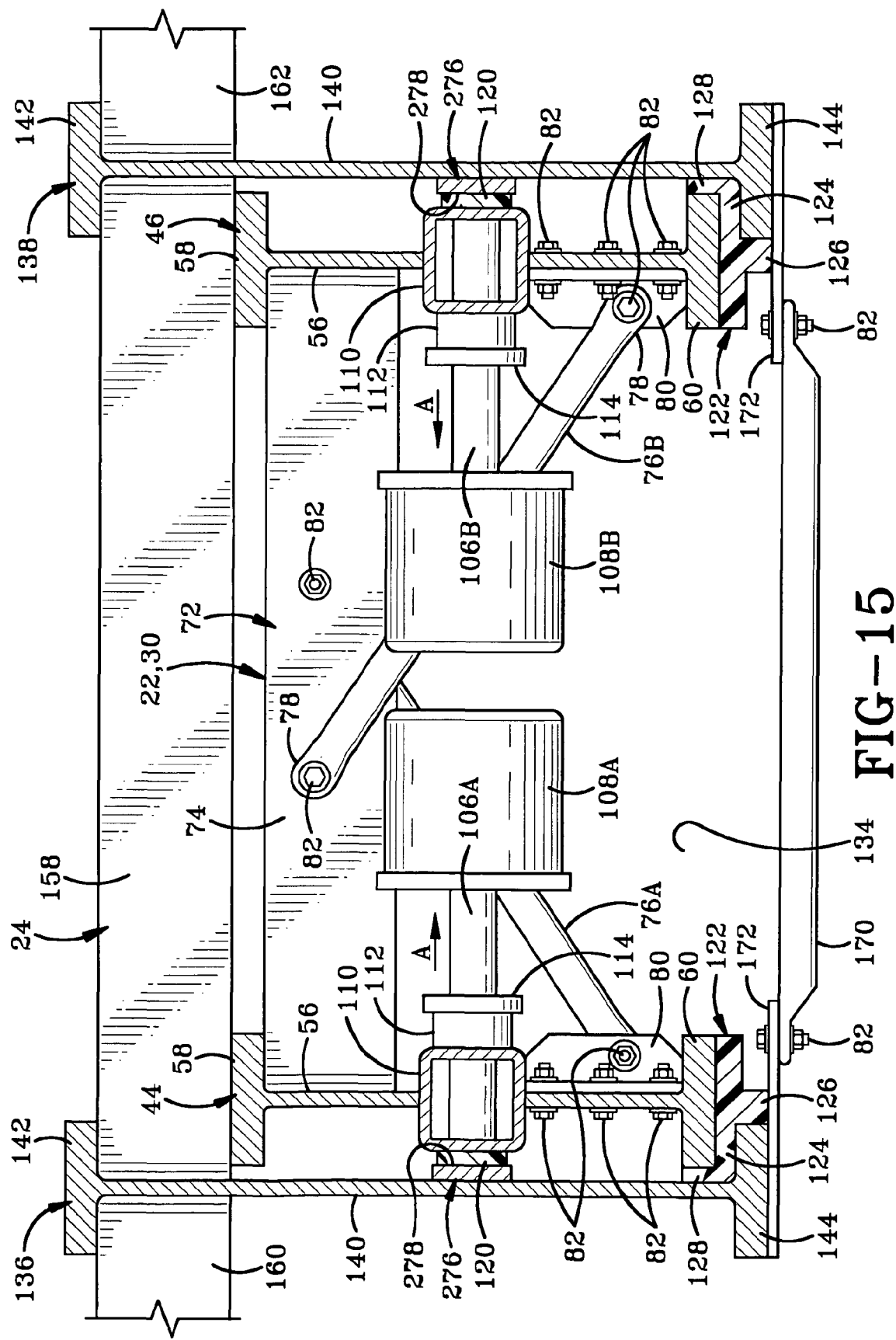
FIG. 15 is a sectional view taken on line 15-15 of FIG. 14 showing the alignment of the front and rear flatbed sections prior to engagement.
Figure 17:
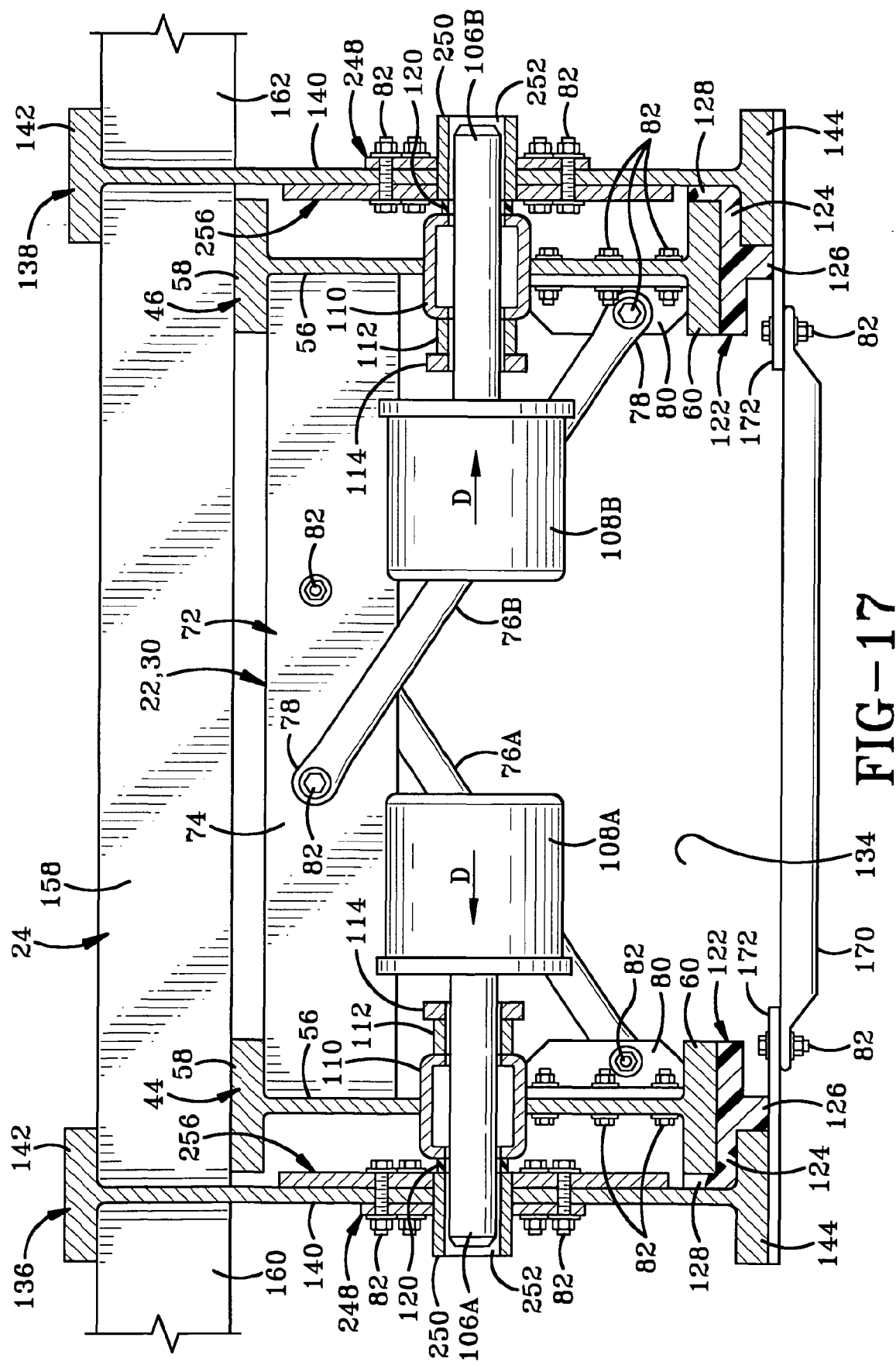
FIG. 17 is a sectional view taken on line 17-17 of FIG. 16 showing the locking pins in the locked position.

The operation of trailer 10 is now described with reference to FIGS. 12-18. FIGS. 12, 14 and 15 show rear end 54 of front flat bed section adjacent front end 130 of rear flatbed section 24 prior to connection of the two flatbed sections, with connector extension 30 of front section 22 aligned with receiving passage 134 of rear section 24. Prior to the insertion of the rear end 54 of connector extension 30 into passage 134 or shortly thereafter, FIG. 12 shows that the pneumatic actuators are actuated to move cylinders 108 axially inwardly toward one another (Arrows A) to in turn move locking pins 106 axially inwardly toward one another (Arrows B) to the unlocked position. In this unlocked position, the outer terminal ends of pins 106 are adjacent the outer surfaces of the respective slide members 120. FIG. 13 represents an initial stage of the insertion of connector 130 into receiving passage 134 as indicated at Arrows C and illustrates a sliding engagement between inner surface 278 of the front wear bar 276 and each of slide member 120 and the outer end of locking pin 106. FIG. 13 also illustrates a sliding engagement between inner surface 260 of the front inner reinforcing plate 256 and each of slide member 120 and the outer end of locking pin 106 during the relative movement of front and rear flatbed sections 22 and 24. As rear section 24 continues to move forward relative to front section 22, slide members 26 and the outer ends of locking pins 106 continue to slide along inner surfaces 278 and 260 until locking pins 106 reach passages 252 of tubes 250 at which time the internal springs of cylinders 108 force cylinders 108 and pins 106 axially outwardly from one another (Arrows D in FIG. 17) to the locked position shown in FIGS. 16-18. During the relative sliding movement between front and rear flatbed sections 22 and 24 prior to reaching the locked position, slide members 120 and locking pins 106 may also slidably engage the inner ends 270 of heads 268 of bolts 264, as shown in part by the locking pin shown in dashed lines of FIG. 18. FIG. 18 also illustrates the sliding engagement between slide member 120 and the inner end of tube 250. Locking pins 106 also slidably engages the inner end of tube 250 during this process. FIG. 17 also illustrates a sliding engagement between each slide member 122 and the lower portion of a respective one of rails 136 and 138. More particularly, base segment 124 slidably engages the upper surface of the inwardly projecting portion of bottom crossbar 144 while projection 126 slidably engages the inwardly facing terminal edge of bottom crossbar 144 and leg 128 slidably engages the lower portion of the inner surface of web 140. Without the use of lubricants such as grease or oils, slide members 120 and 122 reduce the friction substantially which would otherwise occur between two pieces of metal such as two pieces of aluminum. FIG. 17 also shows that top crossbars 58 are adjacent and below central deck rails 158, that bottom crossbars 60 are adjacent and above bottom crossbars 144 and that inner plates 256, slide member 120 and a portion of tube 110 are disposed within the space bounded by webs 56 and 140 and the outer segments of crossbars 58 and 60.

When locking pins 106A are received in the passages 252 of the front eyelets, trailer 10 is in the fully extended position shown in FIG. 1 and thus has its greatest length L1 shown in FIG. 2, which may be for instance approximately 90 feet. On the other hand, actuators 108 may be pneumatically actuated to move locking pins 106 to the unlocked positions so that connector extension 30 may be received to the greatest extent within receiving passage 134 and locking pins 106 may be inserted into the passages 252 of the rearmost eyelets on rear section 24 with rear end 86 of front deck 26 abutting or closely adjacent front end 130 of rear deck 32 in the fully retracted position shown in FIG. 20. The length of trailer 10 in the fully retracted position is illustrated at L2 in FIG. 2 and may be for instance about 45 feet. As previously discussed, FIG. 19 illustrates an intermediate length of trailer 10 in which locking pins 106 are received in one of the intermediate eyelets of rear section 24.

Trailer 300 is now described with referenced to FIGS. 21-23. Referring to FIG. 21, extendable flatbed trailer 300 includes three primary components, which include a front flatbed section 22, a rear flatbed section 24 and an additional front flatbed section 302. As suggested by the numbering, front flatbed section 22 and rear flatbed section 24 have the same configuration as the corresponding sections 22 and 24 of trailer 10. FIG. 21 shows that front section 22 has a length L3 extending from front end 52 to rear end 54. In contrast, front flatbed section 302 has front and rear ends 304 and 306 defining therebetween a length L4 of section 302 which is substantially shorter than that of length L3. In the exemplary embodiment, length L4 is substantially less than ½ of length L3 and closer to but still more than ⅓ the length of L3. The ratio between length L4 and L3 may vary. The front portion of front flatbed section 302 is substantially identical to the front section of front flatbed section 22 and thus retains deck 26, hitch section 28, the tapered section of the primary rails and landing gear 43. However, front flatbed section 302 includes a male connector extension 308 which is substantially shorter than connector extension 30 of front flatbed section 22. More particularly, connector extension 30 has a length L5 extending from the rear end 86 of deck 26 to rear end 54 of front section 22. Connector extension 308 has a length L6 defined between a rear end 310 of deck 26 of front section 302 to rear end 306 thereof. In the exemplary embodiment, length L6 is far less than ½ of length L5, substantially less than ⅓ the length of L5 and typically approximately ¼ the length of length L5. Connector extension 308 retains the securing or locking mechanism as described with reference to trailer 10 utilizing locking pins 106 and the corresponding pneumatic cylinders 108 and so forth. As shown in FIG. 21, slide members 120 and 122 are also retained and mounted on respective primary rails analogous to rails 44 and 46 of front section 22.

In operation, rear flatbed section 24 may be used alternately with either one of front flatbed sections 22 and 302. The use of front and rear sections 22 and 24 with one another provides the same configuration and interactions as discussed with respect to trailer 10 and thus may provide a fully extended configuration as shown in FIG. 22 or may be fully retracted or partially retracted as discussed with regard to trailer 10. On the other hand, the use of front section 302 and rear section 24 provides for a single secured configuration as shown in FIG. 23, which is equivalent in length to the fully retracted configuration of sections 22 and 24 when used together. Connector extension 308 is slidably received within the receiving passage of rear flatbed section 24 in the same manner as described with respect to trailer 10 except that the locking pins 106 will only reach to the front eyelets on section 24 as illustrated with pin 106A being received within the front outer reinforcing plate 248 in FIG. 23 to secure the front and rear sections 302 and 24 together. The alternate use front flatbed section 302 substantially reduces the amount of weight compared to the use of front section 22 in combination with rear section 24. Thus, when there is no need for the use of an extended configuration, the user simply will use front section 302 in combination with rear section 24 to provide for a substantially lighter weight flatbed trailer. Removing front section 302 and replacing it with front section 22 allows for a relatively quick change when there is a need for an extended flatbed configuration. The weight difference between the trailer configurations using front section 22 and front section 302 is easily several hundred pounds and even when formed primarily of aluminum is more typically in the range of about one thousand pounds. Thus, the use of this concept with other metals which are even heavier such as steel may create a relative weight difference substantially in excess of one thousand pounds. In any case, the distinction is considerable.

Extendable flatbed trailer 400 is now described with reference to FIGS. 24-27. Trailer 400 includes a rear flatbed section 24A which is only a slight modification of section 24 in that it includes a pair of front flanges 401 respectively connected to the front ends of primary rails 136 and 138 at front end 130. Trailer 400 further includes first and second front flatbed sections 402 and 404 which are removably connectable to one another. First section 402 is similar to the front segments of front flatbed section 22 and front flatbed section 302 of the previous embodiment, retaining deck 26, hitch section 28 and the tapered portion of primary rails as indicated at 406. First section 402 has front and rear ends 408 and 410 which are the same as the front and rear ends of deck 26 and define therebetween a length L7 of first section 402 which is even less than length L4 of front flatbed section 302 of trailer 300. Both primary rails of the first section 402 include an outwardly extending flange 412 at or adjacent rear end 410.

Second section 404 retains the basic structure of connector extension 30 of front flatbed section 22 and thus retains primary rails such as rail 44A, which is nearly the same as rail 44, the various braces of extension 30 and so forth, including slide members 120 and 122 and locking pins 106. Second section 404 thus has front and rear ends 414 and 416 defining therebetween a length L8 which is substantially the same as length L5 of connector extension 30. Second section 404 is thus substantially a connector section itself substantially similar to connector extension 30 with a pair of front flanges 418 at front end 414 which are similar to flanges 401 of rear section 24. Flanges 418 and 401 may be alternately mounted on rear flange 412 of first section 402.

Figure 27:
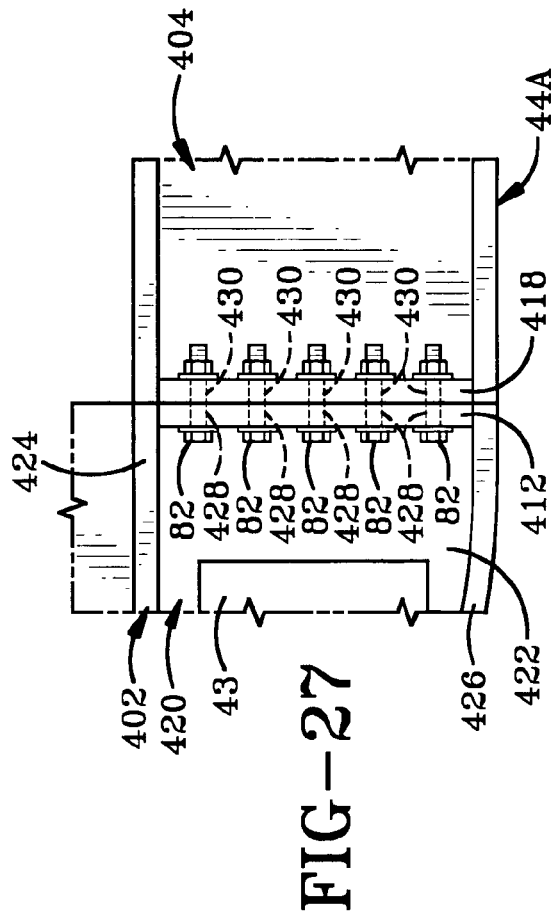
FIG. 27 is an enlarged side elevational view of the encircled portion of FIG. 25.

Thus, flanges 412 and 418 of first and second sections 402 and 404 may be secured to one another so that section 404 may be inserted as a connector extension into the receiving passage of rear section 24A so that locking pins 106 may be received in any one of the eyelets of rear section 24 in order to secure front and rear flatbed sections to one another, for example with pins 106 in the front eyelet to form the fully extended configuration shown in FIG. 25. FIG. 27 better illustrates the connection between first and second sections 402 and 404. FIG. 27 shows the rear end of first section 402 and more particularly shows one of rails 420 typically in the form of an I-beam configuration and thus including a vertical web 422 and top and bottom crossbars 424 and 426 similar to those discussed in previous embodiments. Flange 412 extends vertically between and is welded to crossbars 424 and 426. In addition, flange 412 extends axially outwardly from and is welded to web 420. A plurality of holes 428 are formed in flange 412 for receiving therethrough respective fasteners 82. Similarly, front flange 418 of second section 404 extends between top and bottom flanges 142 and 144 and is welded thereto. Flange 418 also extends outwardly from and is welded to web 140. A plurality of holes 430 are formed in flange 418 and aligned with holes 428 for receiving fasteners 82 which secure flanges 412 and 418 together in order to secure first and second sections 402 and 404 to one another to form the extendable flatbed configuration.

Figure 26:
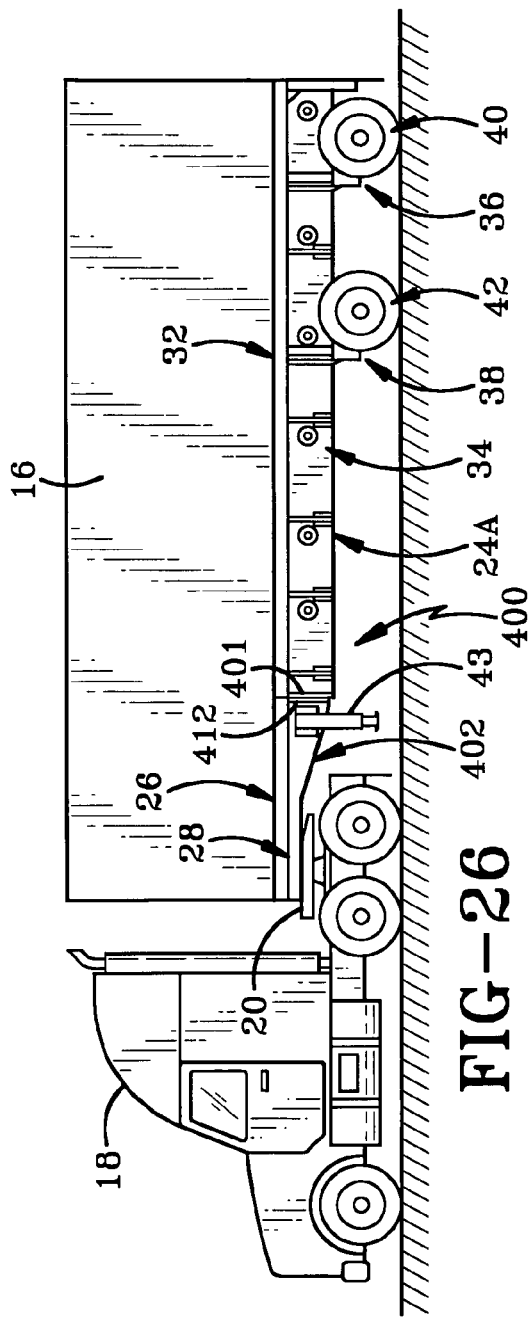
FIG. 26 is similar to FIG. 23 and shows the third embodiment in its fully retracted position with a container on top in a box trailer configuration.

In the alternate configuration shown in FIG. 26, fasteners 82 have been removed from flanges 412 and 418 in order to separate first and second sections 402 and 404 and then used to join flanges 412 and 401 in order to secure first section 402 to rear section 24A in a configuration which is analogous to the fully retracted position of the previously described extendable flatbed trailers. Similar to trailer 300, trailer 400 provides for the use of three major components which when used in conjunction provide an extendable flatbed trailer which functions essentially the same as trailer 10 and a second configuration in which second flatbed section 404 is removed and first section 402 is connected directly to rear section 24A to provide a standard flatbed trailer while removing the substantial weight involved with the use of second section 404. In the latter configuration, the connector extension represented by second section 404 is completely eliminated, including the securing mechanism which utilizes locking pins 106 and pneumatic actuators 108. The weight difference between the two configurations is thus even greater than that discussed with respect to the two configurations of trailer 300.

Having described the structure and operation of the preferred embodiments of the extendible flatbed trailer, a preferred embodiment roller system will now be described in detail and should be viewed in light of FIGS. 28 through 47. In particular, front flatbed section 22 is illustrated in FIGS. 28 through 33 and rear flatbed section 24 is illustrated in FIGS. 34 through 38.

Initially, front section 22 includes a front section roller support assembly 502 extending rearward from and past rear end 54 arranged for engagement with rear flatbed section 24 to provide a reduced rolling resistance between the sections. Rear flatbed section 24 also includes a rear section roller support assembly 556 which is engaged with front section 22 to provide a reduced rolling resistance between the sections. In particular, roller support assembly 502 and rear section roller support assembly 556 move axially with respect to each other to provide a clearance between the sections and reduce the friction to allow smoother and easier relative movement between the front and rear sections.

Figure 28:
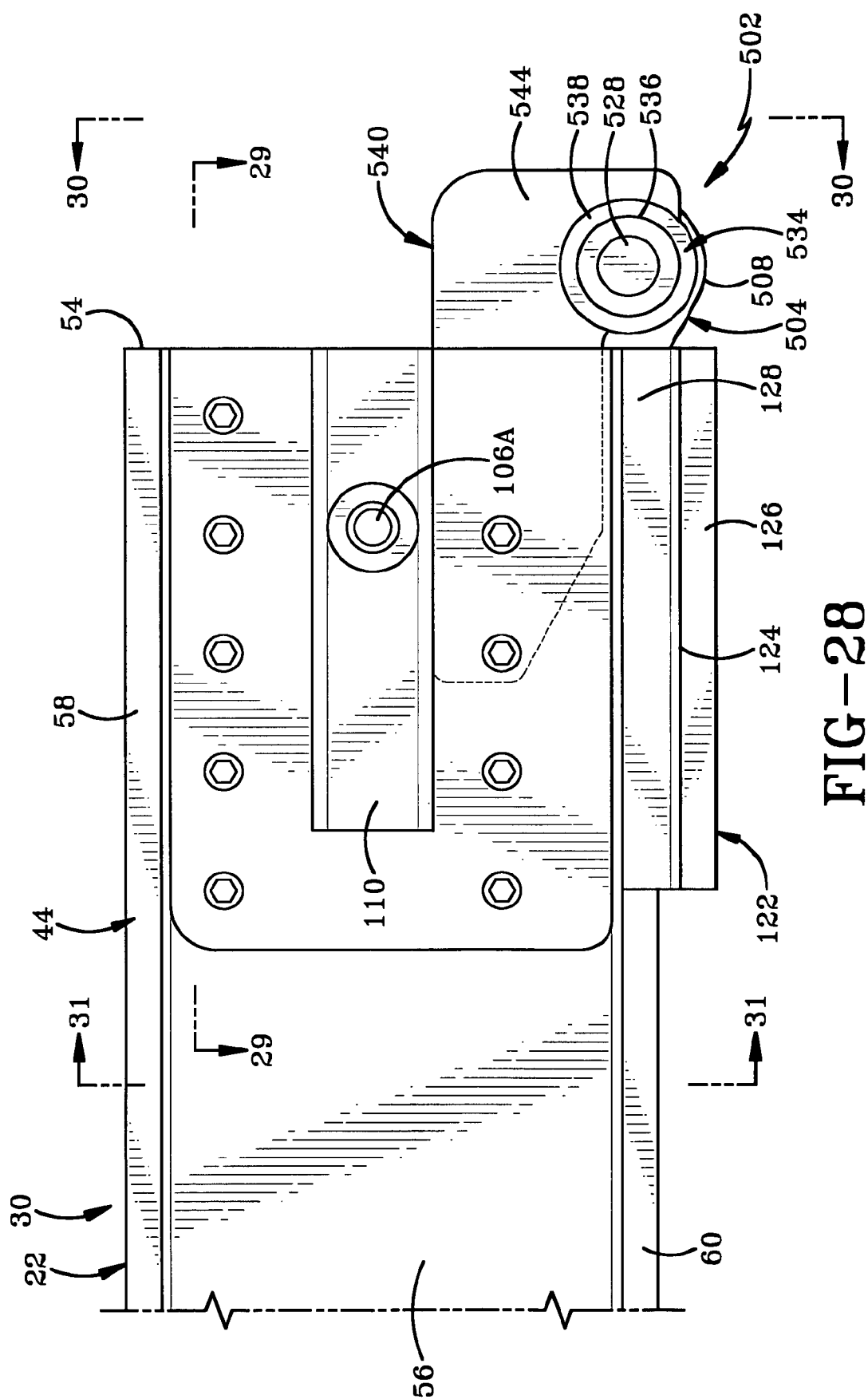
FIG. 28 is a side elevational view of the roll support assembly attached to the front flatbed section.
Figure 29:
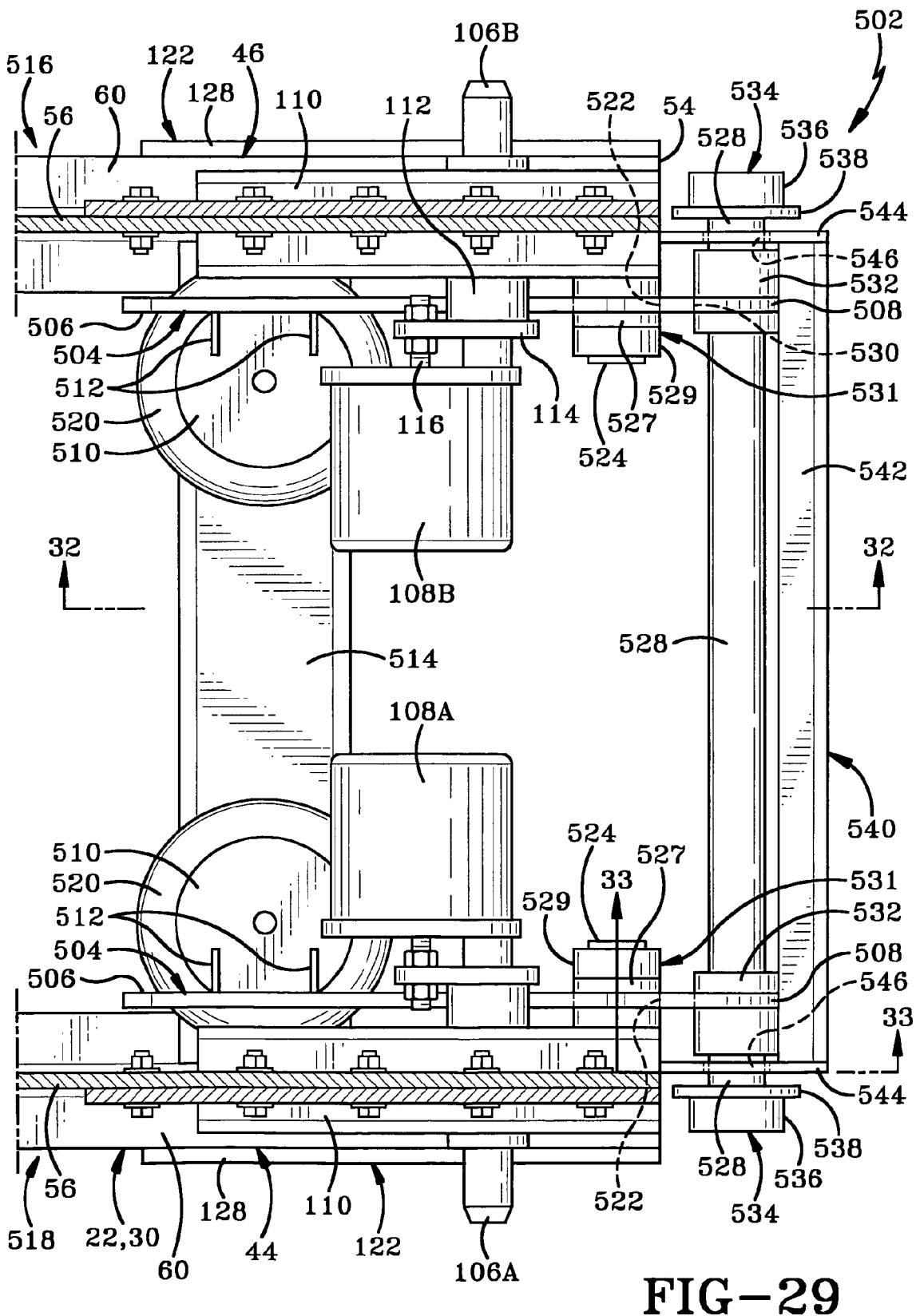
FIG. 29 a top plan view of the roll support assembly of the front flatbed section with portions cut away taken on line 29-29 of FIG. 28.

Referring now to FIGS. 28 and 29, roller support assembly 502 has a driver side and a passenger side, each of which is identical and functions in unison. A pivot bracket 504 is located on each side of rear end 54 and each bracket has a front end 506 and a back end 508. A lift bracket 510 is connected to front end 506 with a pair of arms 512 extending perpendicularly from the lift bracket. A cross beam 514 is disposed along the bottom of front section 22 and extends from a passenger side 516 to a driver side 518. In a preferred embodiment, an air spring 520 is located between lift bracket 510 and cross beam 514, however any suitable device which is capable of providing vertical movement on command is within the spirit and scope of the present invention as claimed. Pivot bracket 504 further includes a through hole 522 in a position such that the through hole is located proximate rear end 54. Through hole 522 receives a pivot assembly 531 with a shaft 524 and a retainer ring 529 which surrounds the shaft to keep pivot bracket 504 separated from rails 44 and 46 as well as prevent a bushing 527 from falling off of shaft 524. Retainer ring 529 may be maintained on shaft 524 with a set screw (not shown) or other suitable fastener. Bushing 527 is pivotally mounted on shaft 524 adjacent retainer ring 529. Further, bushing 527 may be welded to pivot bracket 504 within through hole 522 such that the bushing pivots with the pivot bracket.

In accordance with one of the main features of the invention, front section roller support assembly 502 includes a roller shaft 528 traversing from passenger side 516 to driver side 518. Back end 508 of pivot bracket 504 has a hole 530 arranged to receive the roller shaft, and a bushing 532 surrounding the roller shaft. Outward of each pivot bracket 504, a roller wheel 534 is rotatably attached on each end of central shaft 528. Roller wheel 534 has an outer surface 536 which is preferably round in shape. A shoulder 538 is preferably integral to and has a larger diameter than roller wheel 534 such that the shoulder helps to prevent the front section from moving towards either the driver and passenger sides.

Extending still further from rear end 54 is a brace assembly 540 which includes a brace 542 and a pair of legs 544. Each leg 544 has an elongated slot 546 through which roller shaft 528 passes through. In particular, brace assembly 540 extends rearward beyond roller support assembly 502 and elongated slot 546 limits the vertical travel of the roller support assembly as will be described below.

Figure 30:
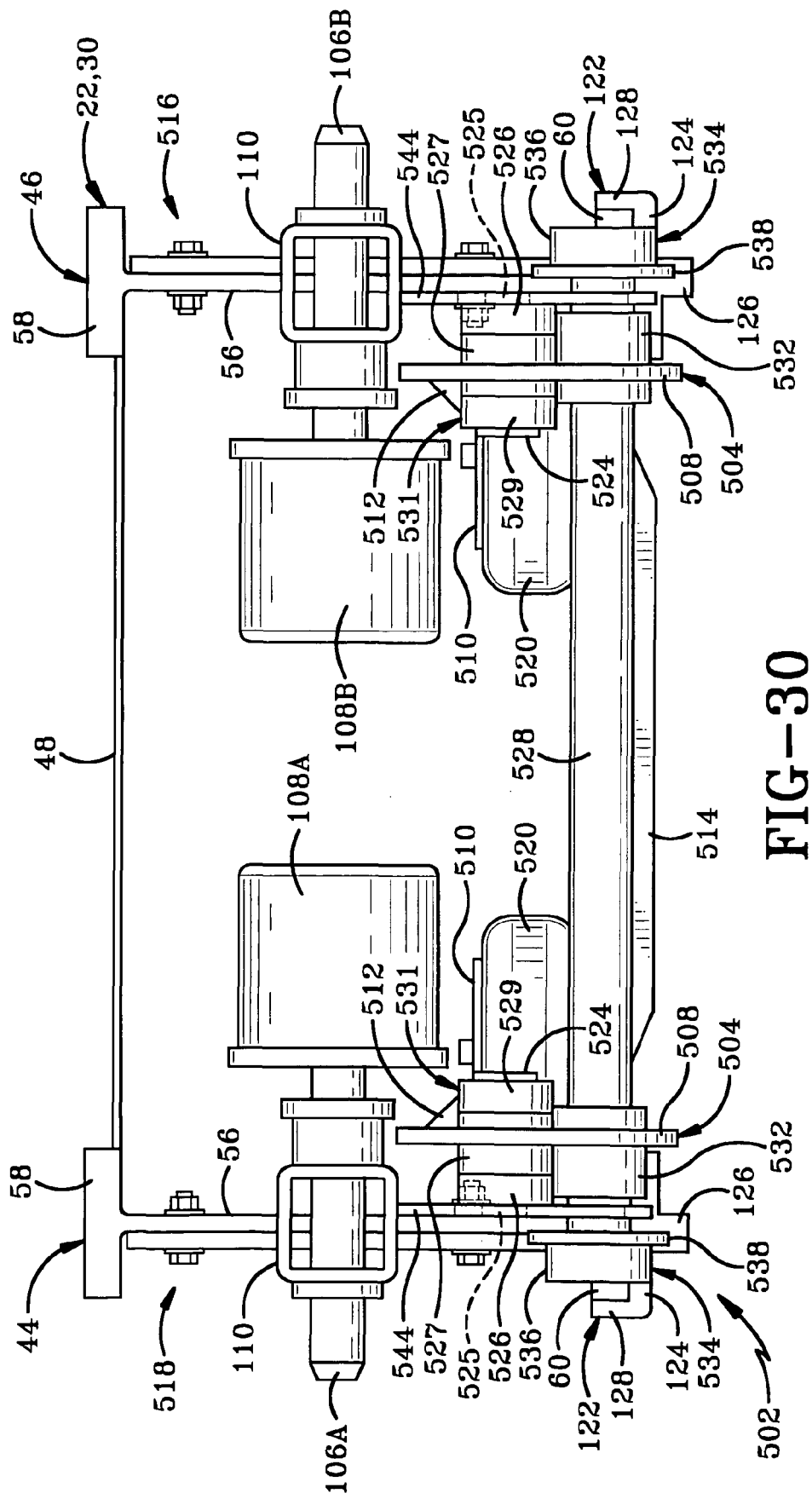
FIG. 30 is an end view of the roll support assembly of the front flatbed section with the brace assembly removed taken on line 30-30 of FIG. 28.
Figure 31:
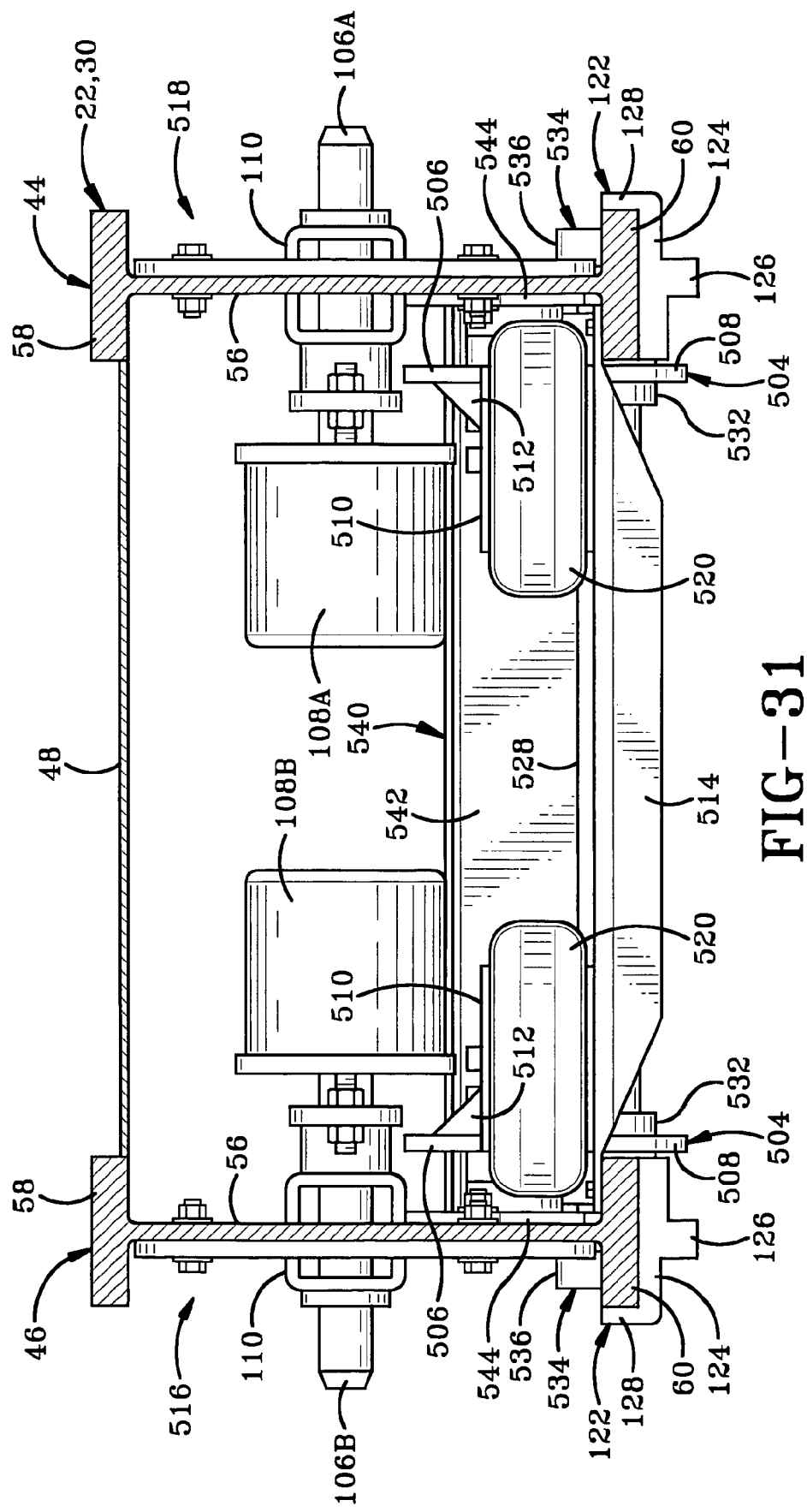
FIG. 31 is an end wise view of the roll support assembly of the front flatbed section with portions cut away taken on line 31-31 of FIG. 28.

FIGS. 30 and 31 are front and rear views of front flatbed section 22 in the disengaged position, or when air spring 520 is exhausted, and the roller support assembly is inactive. In FIG. 30, brace 542 has been removed to show the connection between the roller support assembly and the front flatbed section. Each shaft 524 is secured to leg 544 and held in place by welding through a hole 525 in the leg that has a diameter smaller than shaft 524. Preferably, roller support assembly 502 is arranged to be at a height approximately just above slide member 122 or may be in slight contact. Advantageously, this allows the roller support assembly to require very little vertical travel to reduce friction at the slide member, while still allowing slide member 122 to remain in full contact with the rear flatbed section as necessary.

Figure 32:
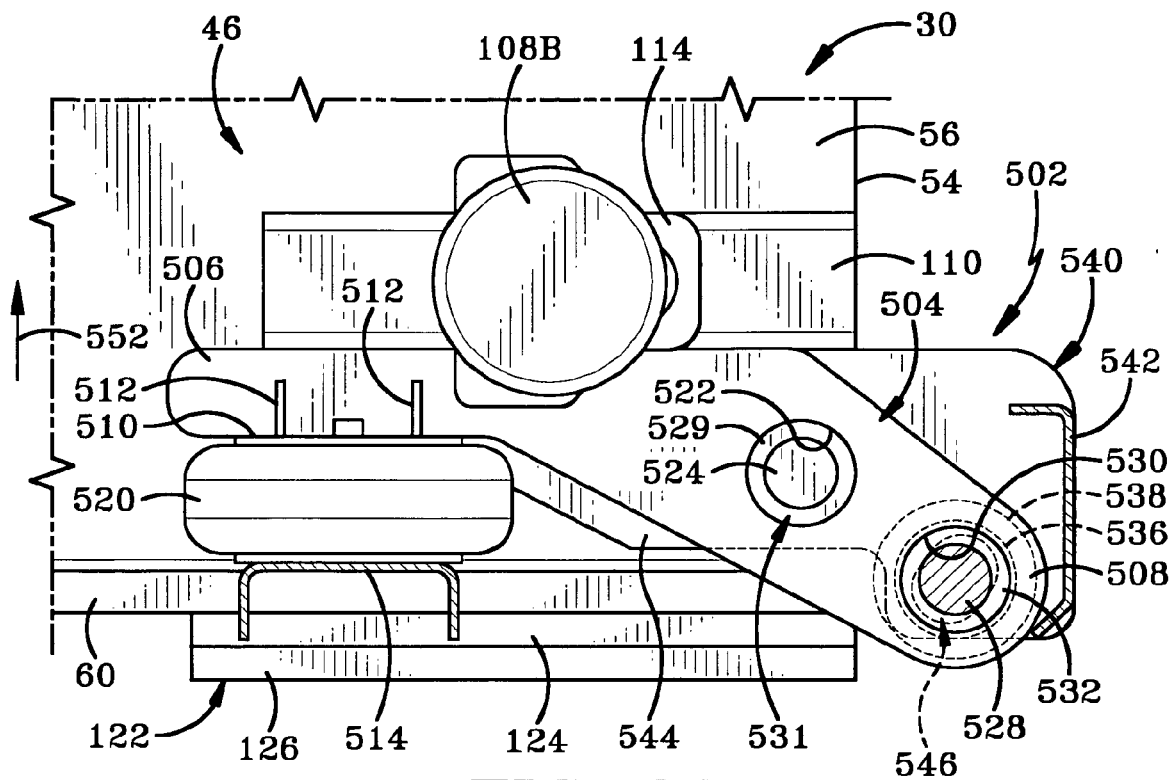
FIG. 32 is a side elevational view of the roll support assembly of the front flatbed section with portions cut away taken on line 32-32 of FIG. 29.
Figure 33:
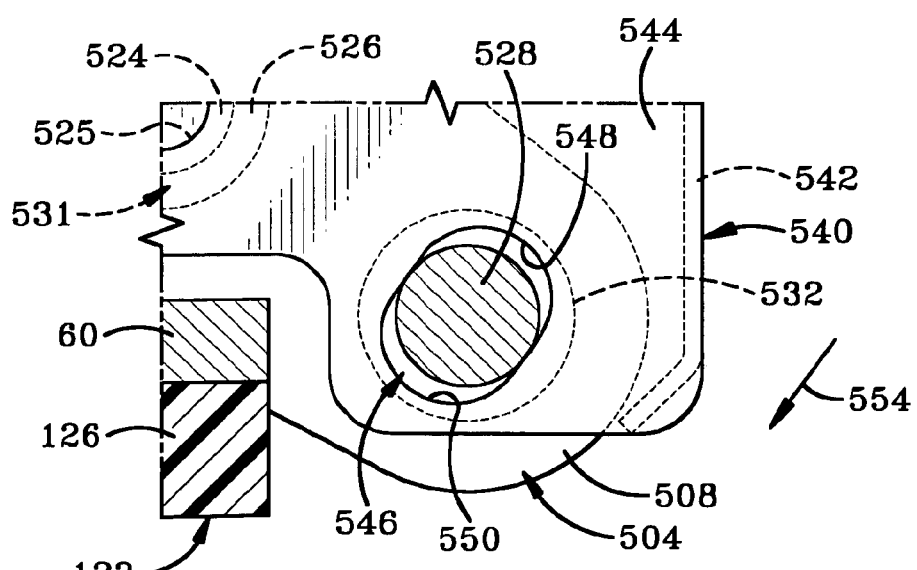
FIG. 33 is an enlarged view of the roll support assembly of the front flatbed section taken on line 33-33 of FIG. 29.

Referring now to FIGS. 32 and 33, a better view of pivot bracket 504 can be seen with air spring 520 again in the exhausted state. As described above, legs 544 of brace assembly 540 each include elongated slot 546 which has both an upper portion 548 and a lower portion 550. The elongated slot is preferably disposed at a slight angle due to the placement of the pivot and the ensuing rotational movement of pivot bracket 504. The upper and lower portions of the elongated slot limit the vertical travel of the pivot bracket by preventing roller shaft 528 from moving above upper portion 548 and below lower portion 550.

Having described the structure of the front section roller support assembly, the operation will now be described and should be read in light of FIGS. 28 through 33. Air spring 520 is inflated and, since the air spring is fixed to cross beam 514, lift bracket 510 is raised in the direction associated with arrow 552. As seen in FIGS. 32 and 33, pivot bracket 504 and bushing 527 then rotate about shaft 524 which in turn moves roller shaft 528 within elongated slot 546 towards lower portion 550 in the direction associated with arrow 554. In this arrangement, more vertical travel is required from the air spring because the movement at roller shaft 528 imparts both vertical and horizontal components. Nevertheless, due to the weight of the front flatbed section, incorporation of a pivot bracket produces a lever arm effect (which substantially increases torque) instead of just a vertical air spring and thereby reduces the air spring force necessary to lift the front flatbed section off of the slide member.

Figure 34:
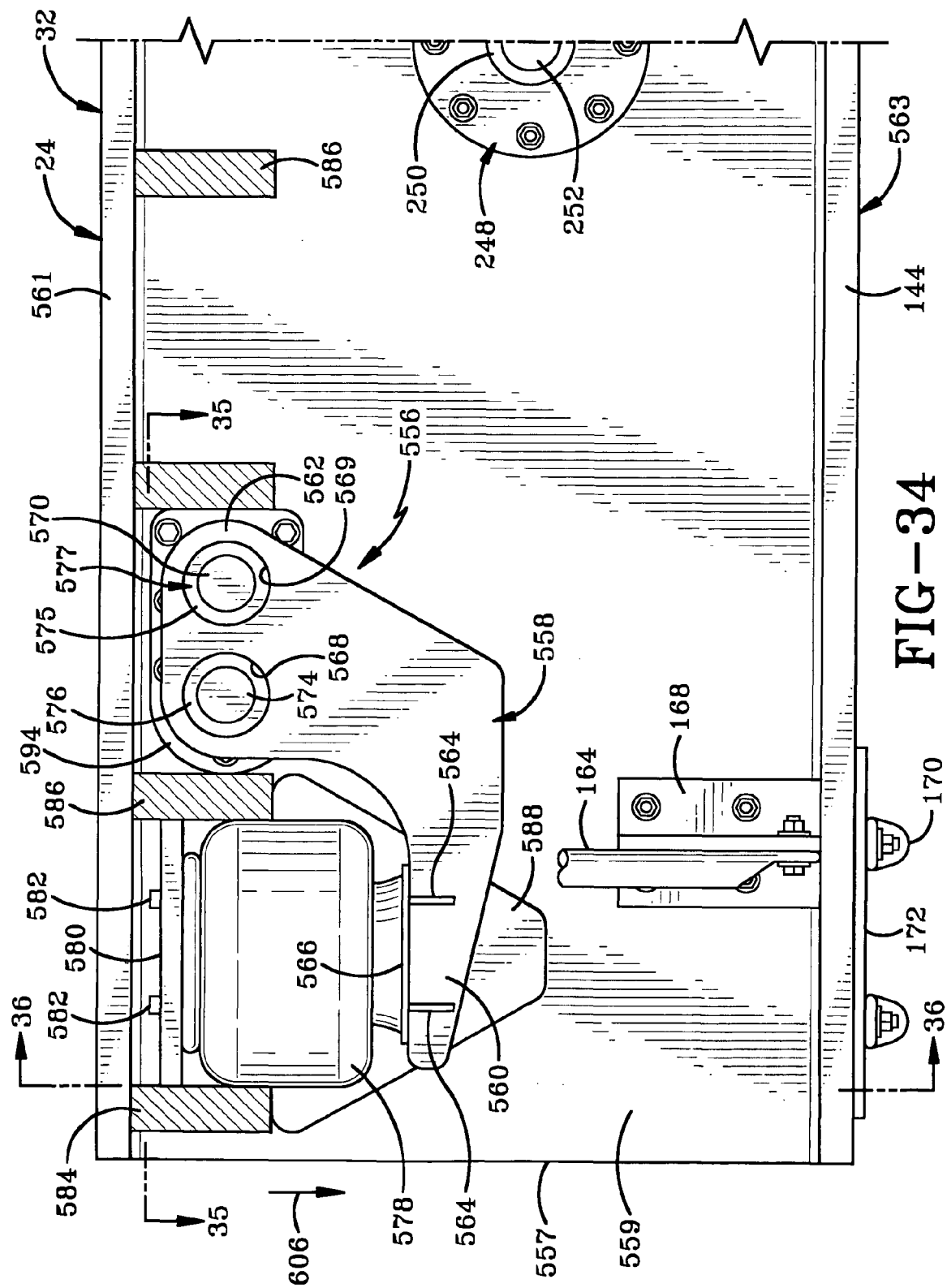
FIG. 34 is a side elevational view of the roll support assembly of the rear flatbed section with portions cut away.
Figure 35:
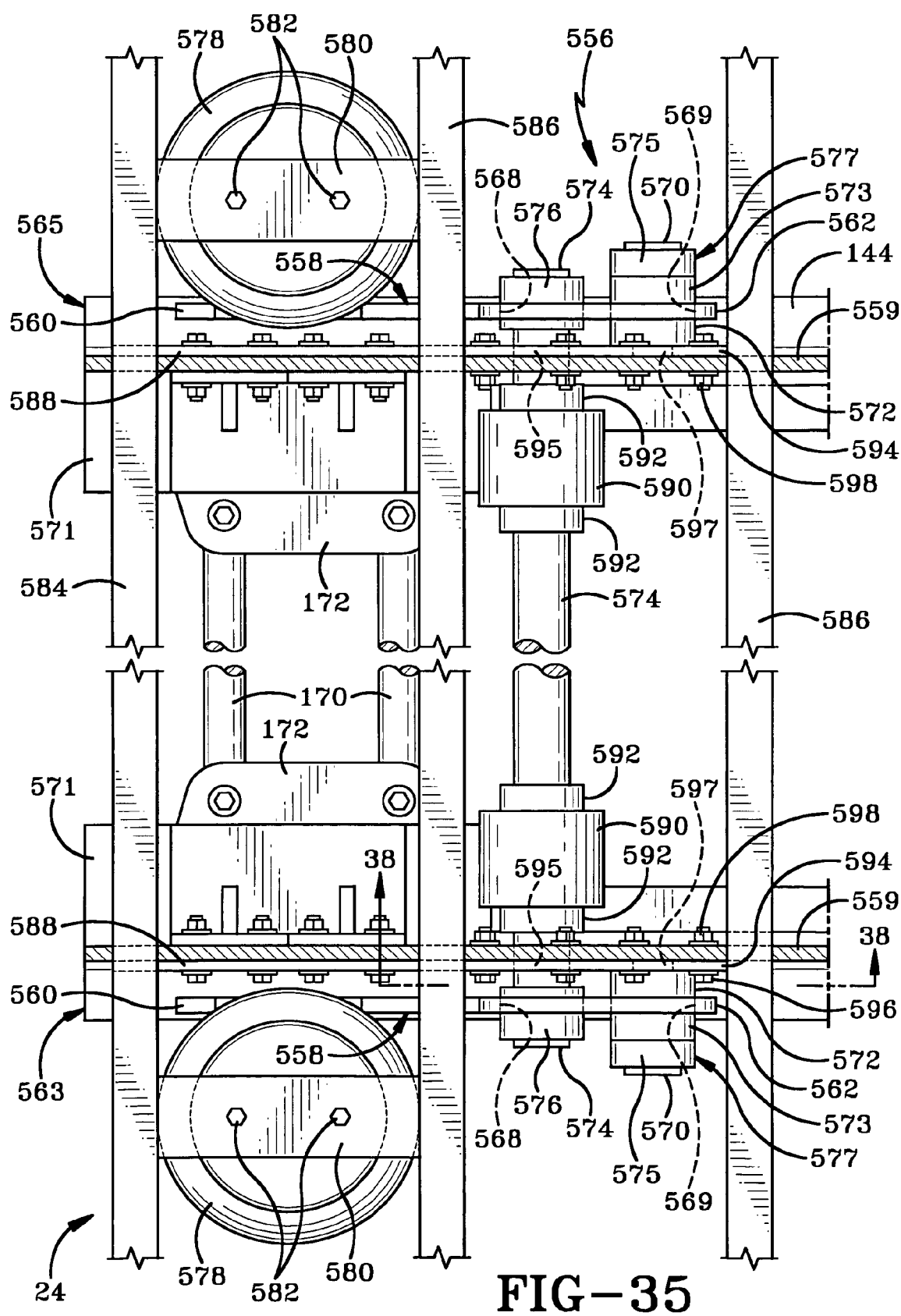
FIG. 35 is a top plan view of the roll support assembly of the rear flatbed section with portions cut away taken on line 35-35 of FIG. 34.
Figure 36:
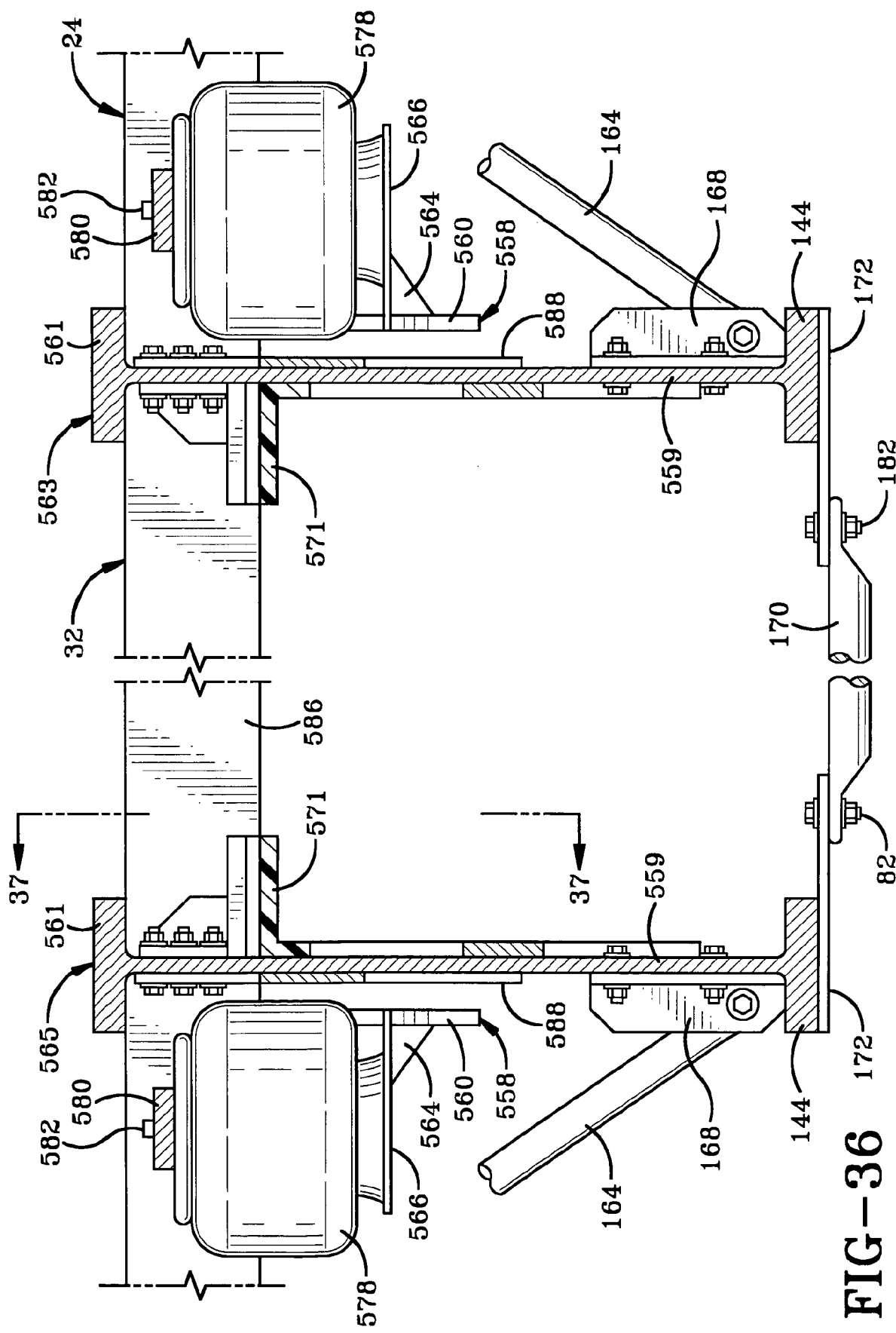
FIG. 36 is an end wise view of the roll support assembly of the rear flatbed section with portions cut away taken on line 36-36 of FIG. 34.

Referring now to FIGS. 34, 35, and 36, rear flatbed section 24 includes a rear section roller support assembly 556 at a front end 557 with portions of the assembly on each side of web 559 and below upper portion 561 of each beam. The rear section roller support assembly includes a pivot bracket 558 which has both a front end 560 and a back end 562. In a preferred embodiment, pivot bracket 558 has a generally C-shaped portion such that front end 560 and back end 562 are offset from one another and generally perpendicular to each other.

Extending upwards from front end 560 is a lift plate 566 having two triangular members 564 welded to the lift plate and front end 560. Back end 562 defines a through hole 568 and a through hole 569 which are spaced apart but parallel to each other. A pivot assembly 577 includes a central shaft 570 with a bushing 573 which traverses through hole 569. On the inside of bushing 573 is a spacer 572 which helps to assure proper operation of bushing 573 as well as prevent bushing 573 from moving axially. Spacer 572 may be held in place with set screws and bushing 573 is preferably welded to pivot bracket 558 around through hole 569. Outward of bushing 573 is a retainer ring 575 which prevents axial movement of bushing 573 and may be held in place with a set screw. Further, central shaft 570 is arranged to allow pivot bracket 558 to smoothly rotate about the central shaft as necessary. A bushing 576 surrounds roller shaft 574 and traverses through hole 568. The roller shaft extends through web 559 of both rails 563 and 565 and pivot brackets 558. Thus, roller shaft 574 has an overall length greater than the distance between rails 563 and 565 and greater than the distance between pivot brackets 558.

An air spring 578 sits on plate 566 and is bolted to an upper plate 580 with bolts or screws 582. Upper plate 580 is secured between beams 584 and 586 by welding, however any suitable connection means known in the art may be utilized. Beam 584 is located at front end 557 of the rear flatbed section. Further, a triangular support plate 588 is disposed between beams 584 and 586 to provide additional support for the support pad and beams 584 and 586.

Referring specifically to FIG. 35, the portions of the rear section roller support assembly located between rails 563 and 565 will described. As described above, Roller shaft 574 extends through the area defined by rails 563 and 565. Roller shaft 574 has a pair of roller wheels 590 rotatably engaged thereon, with one of the roller wheels located proximate rail 563 and the other roller wheel located proximate rail 565. A bushing 592 is disposed intermediate each roller wheel and shaft 574. In particular, bushing 592 allows roller wheel 590 to spin as well as locate the roller wheel along the shaft. The bushings may also be held in place with a set screw or a similar fastener.

Figure 37:
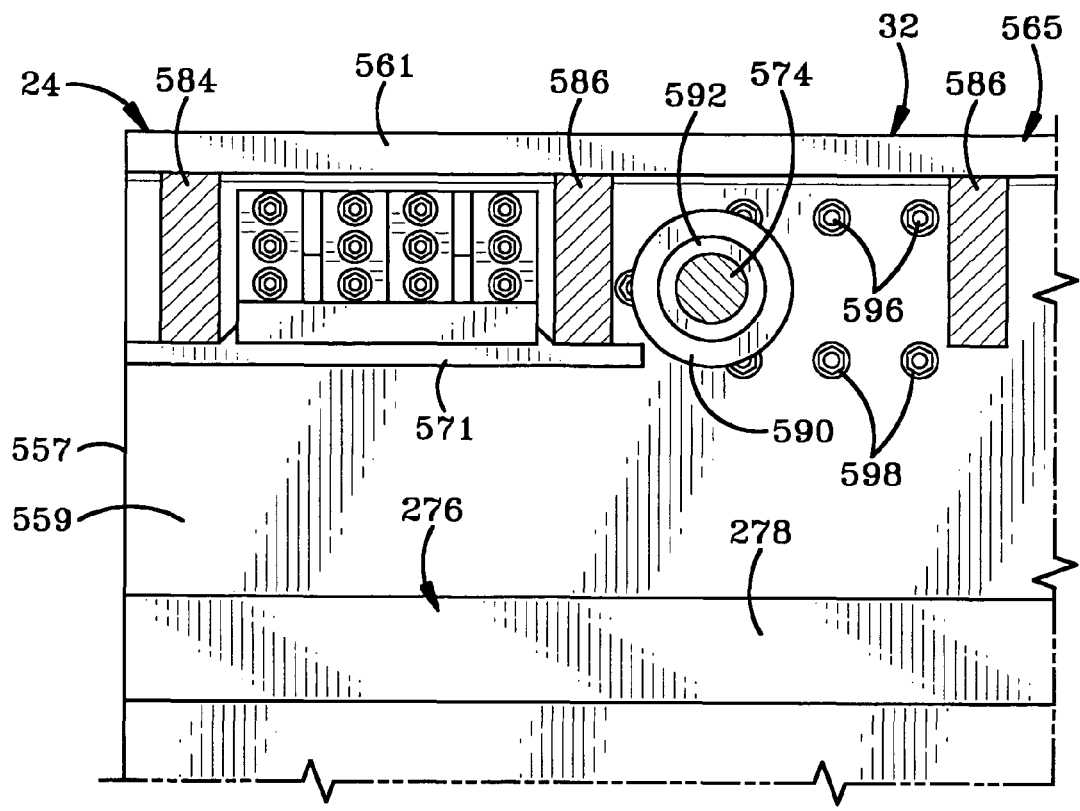
FIG. 37 is a side elevational view of the roll support assembly of the rear flatbed section taken on line 37-37 of FIG. 36.
Figure 38:
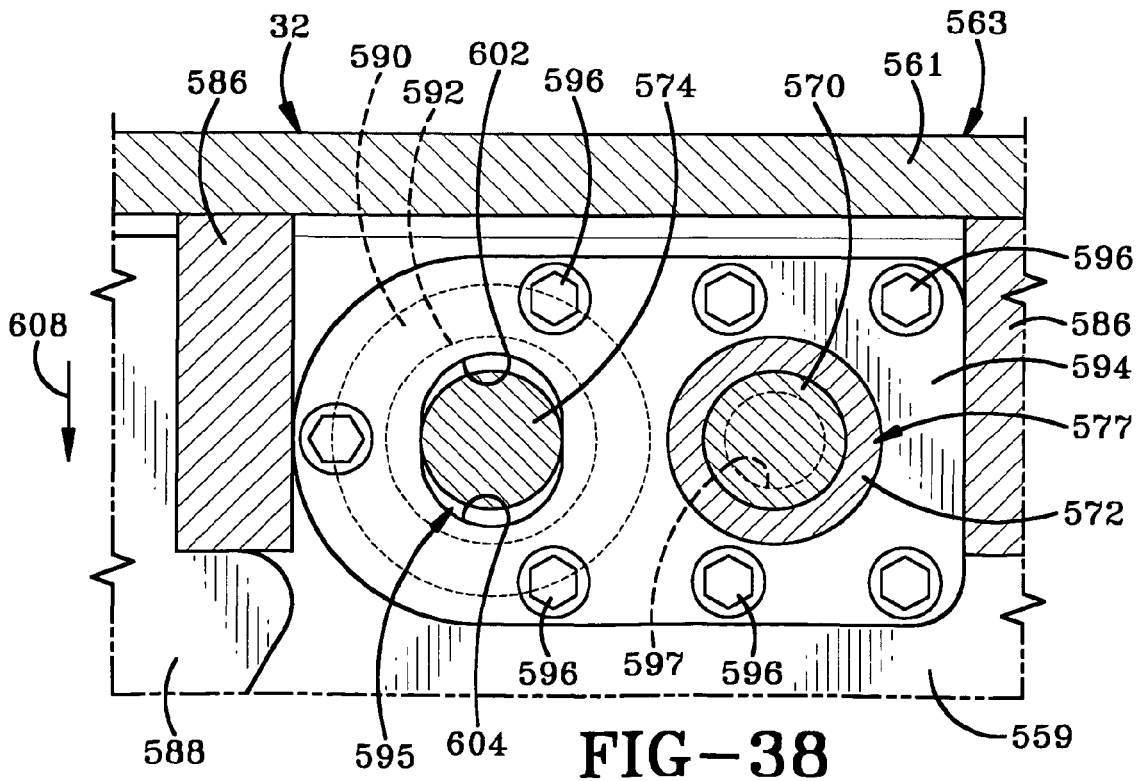
FIG. 38 is an enlarged side elevational view of the roll support assembly of the rear flatbed section taken on line 38-38 of FIG. 35.

FIGS. 37 and 38 illustrate views of the central shaft from between the rails and outside of web 559, respectively. A reinforcement bracket 594 is located outward of web 559 and includes both an elongated slot 595 and through hole 597. The reinforcement bracket is secured to web 599 with bolts 596 which extend inward through the web and receives nuts 598. Elongated slot 595 includes an upper portion 602 and a lower portion 604. The upper and lower portions limit the travel of roller shaft 574 similar to the elongated slot 546 of the front flatbed section.

Having described the structure of the rear section roller support assembly, the operation will now be described and should be viewed in light of FIGS. 34-38. Air spring 578 is inflated and, since the air spring is fixed to upper plate 580, plate 566 is lowered in the direction associated with arrow 606. Pivot bracket 558 then rotates about central shaft 570 which in turn moves roller shaft 574 within elongated slot 595 towards lower portion 604 in the direction associated with arrow 608. Further, both of the air springs on each side of the rear flatbed section work together to provide smooth operation.

Figure 39:
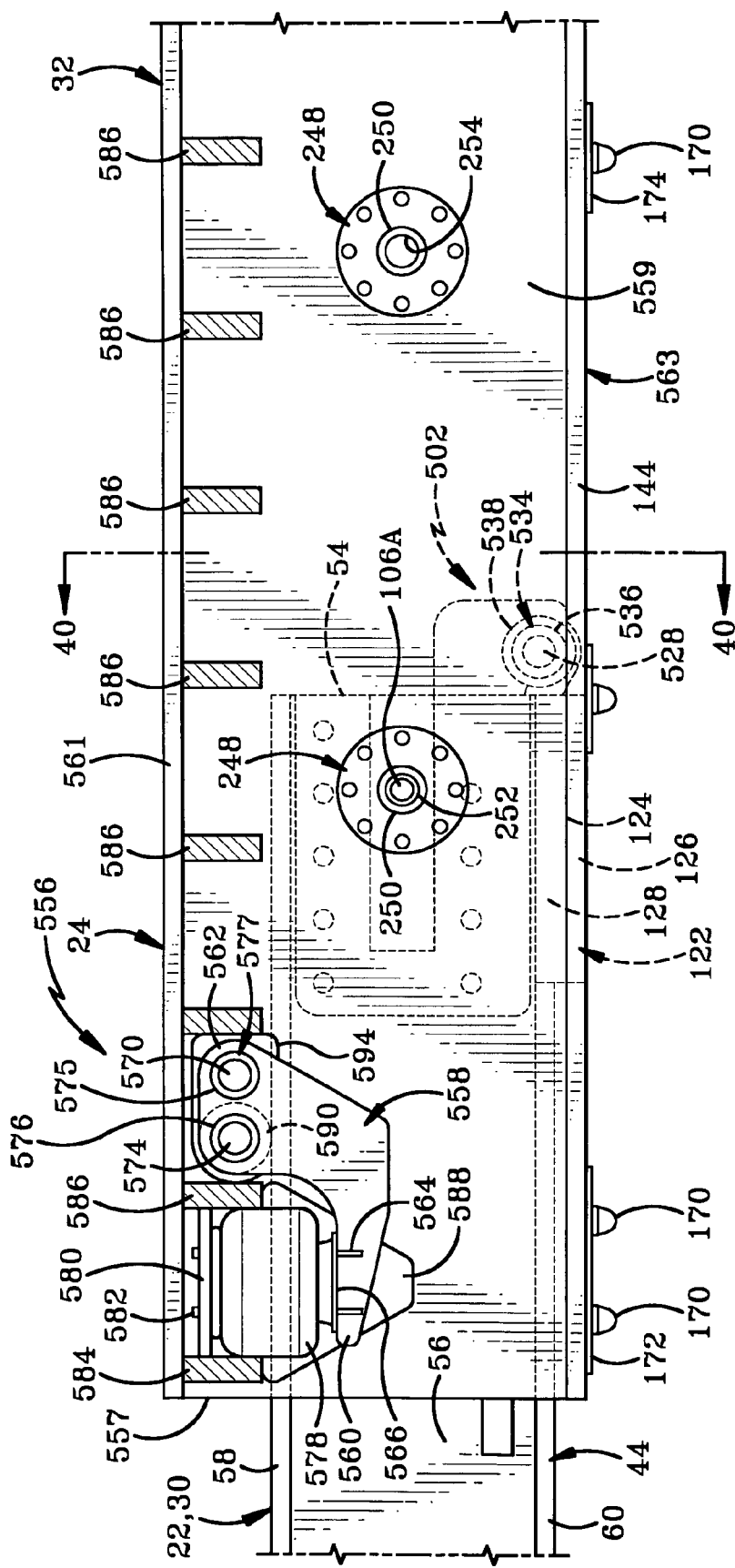
FIG. 39 is a side elevational view of the front and rear flatbed sections each with a roll support assembly.
Figure 40:
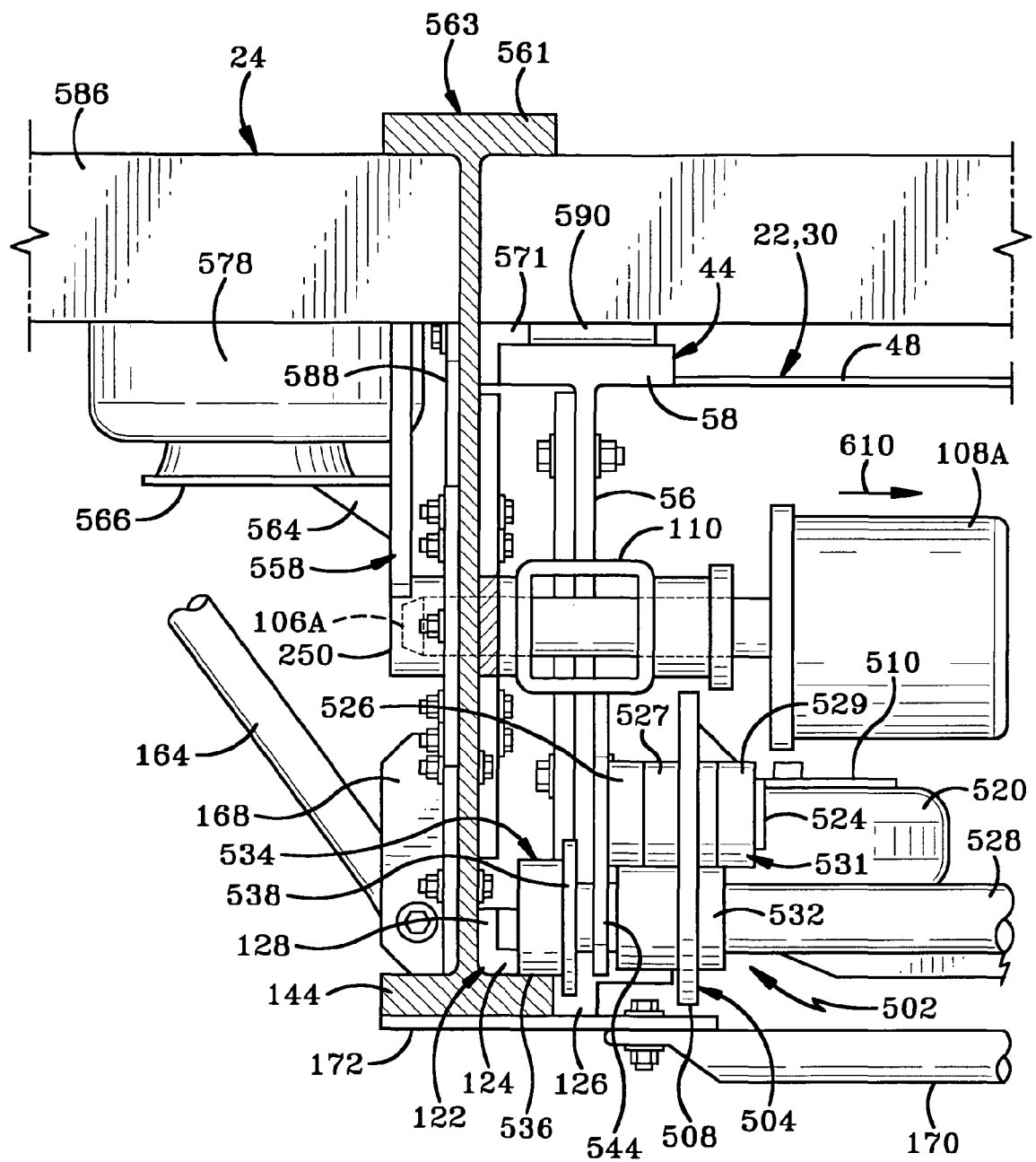
FIG. 40 is an end wise view of the front and rear flatbed sections each with a roll support assembly with portions cut away taken on line 40-40 of FIG. 39.

Having described the structure and operation of both of the front and rear flatbed trailer section roller support assemblies, the interaction and method of operation will now be described in detail and should be viewed in light of FIGS. 39-47. FIG. 39 is a side view of the front flatbed section shown partially in dashed lines and inserted within the rear flatbed section. In particular, outer surface 536 of roller wheel 534 is located proximate crossbar 144. FIG. 40 illustrates roller wheel 590 of the rear flatbed section resting proximate rail 44, as well as roller wheel 534 located proximate crossbar 144. Further, the first step in sliding the front flatbed section within the rear flatbed section requires displacing pneumatic cylinder 108A inward in the direction associated with arrow 610 to allow relative movement between the sections. Similarly, pneumatic cylinder 108B (not shown) is displaced inward.

Figure 41:
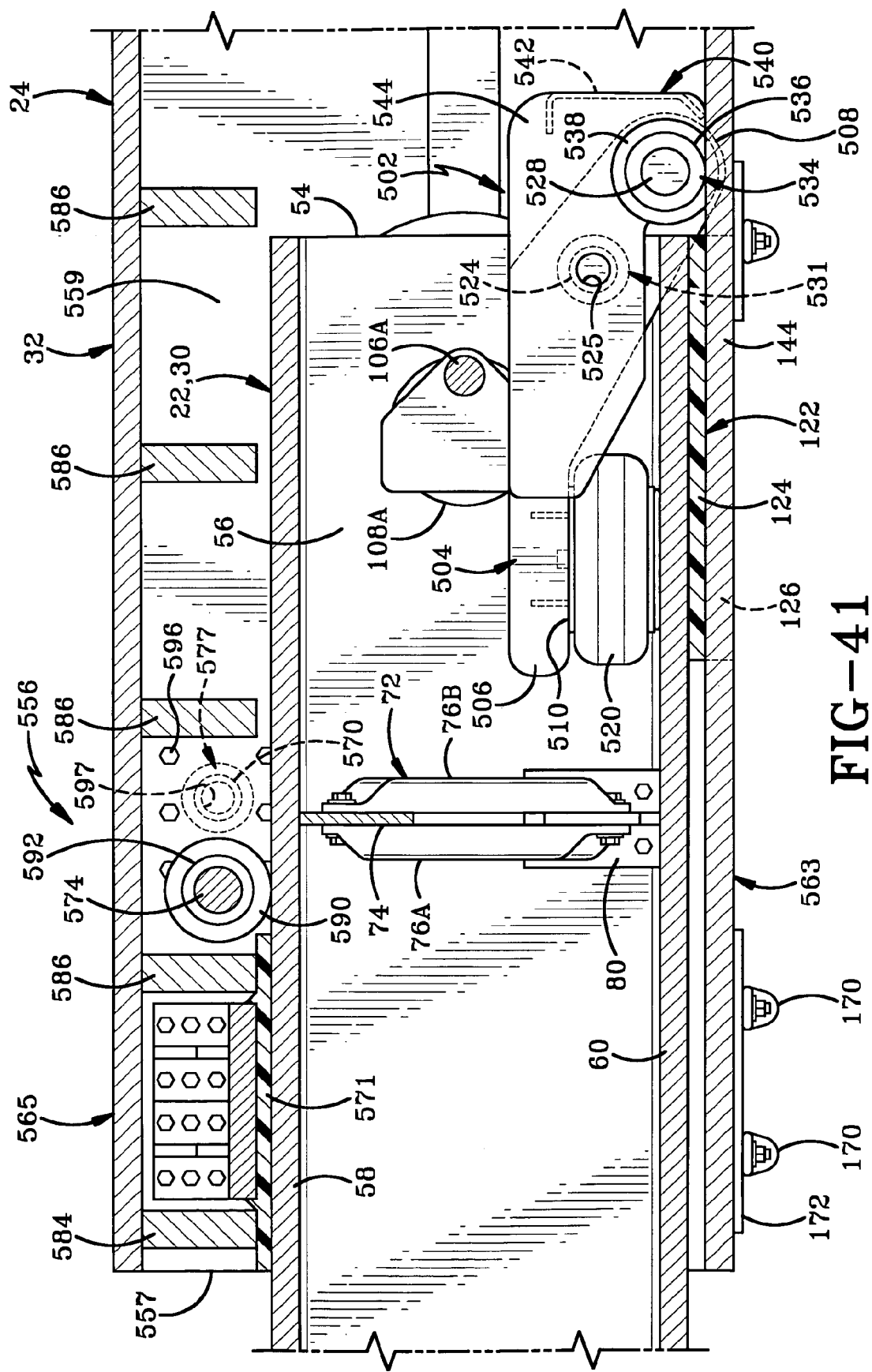
FIG. 41 sectional view of the roll support assemblies of the front and rear flatbed sections.
Figure 42:
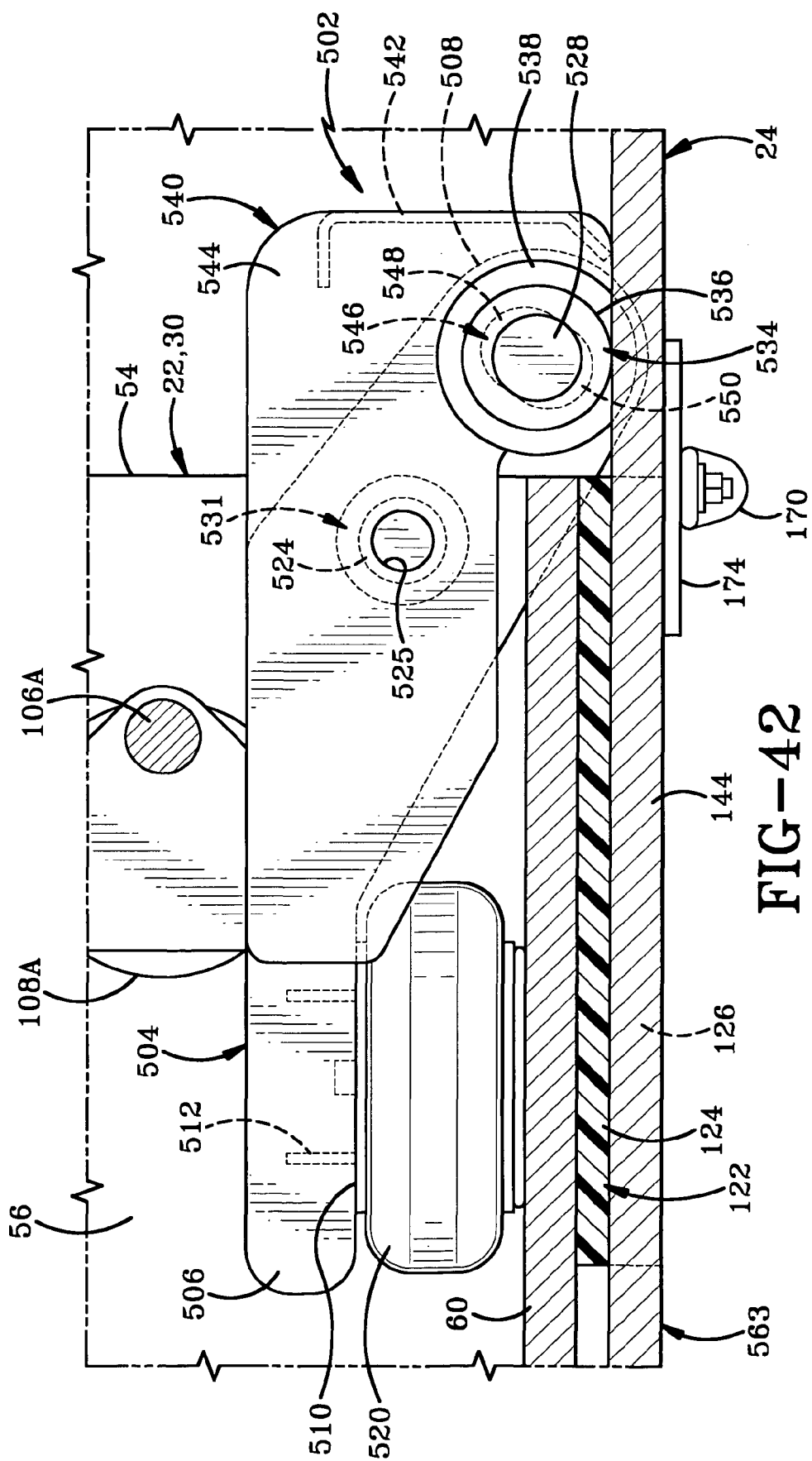
FIG. 42 is an enlarged view of the front flatbed section roll support assembly interacting with the rear flatbed section.
Figure 43:
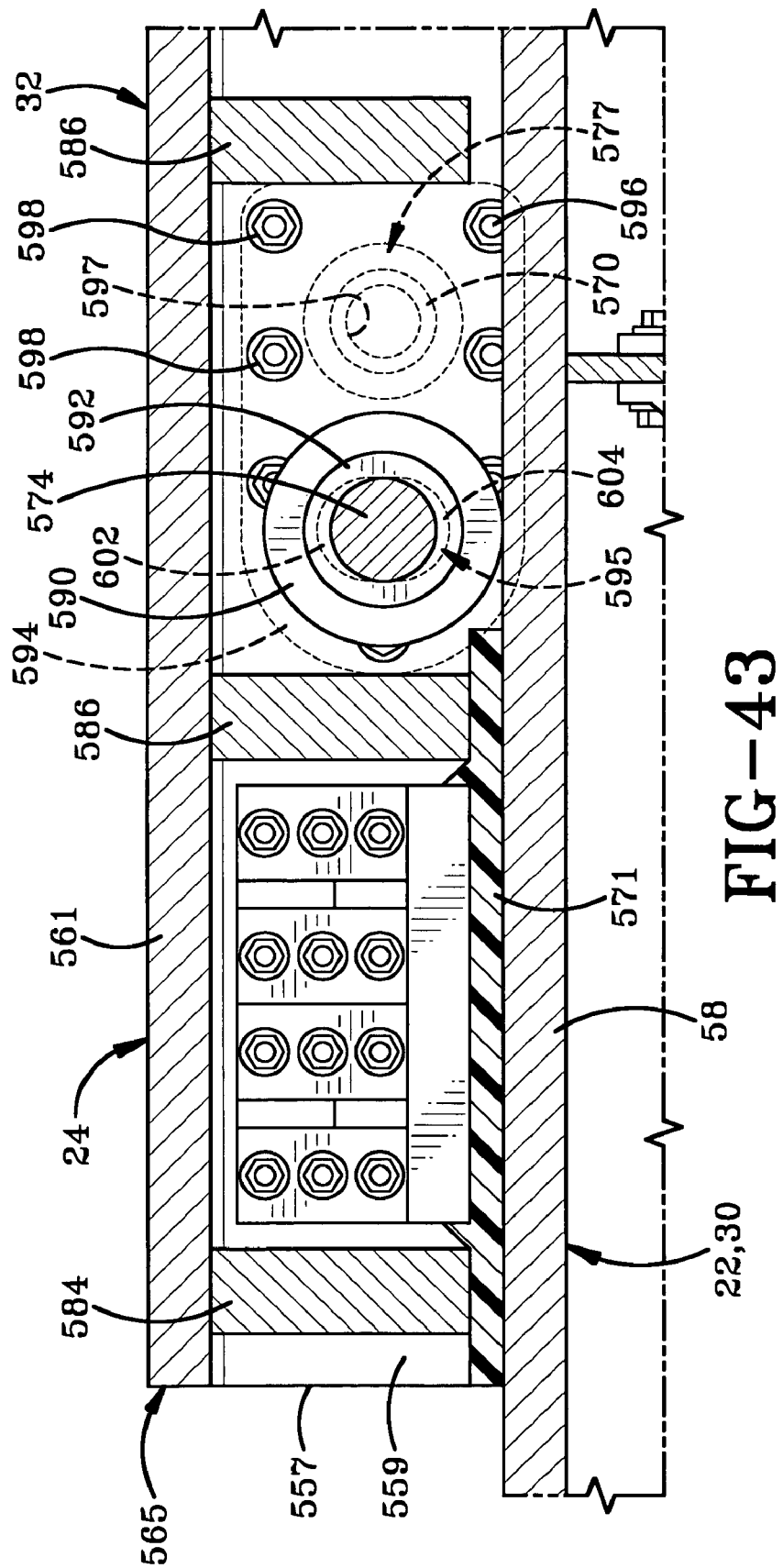
FIG. 43 is an enlarged view of the rear flatbed section roll support assembly interacting with the front flatbed section.

FIGS. 41, 42, and 43 are enlarged views of the interaction between the front and rear flatbed trailer sections when both of the front and rear flatbed sections are each in contact with sliding members 122 and 571. In this arrangement, the friction between each section and the sliding pads is low enough to allow relative movement between the front and rear sections, but the friction is still significant enough to require a lot of force and generates a lot of heat. Further, both roller wheels 534 and 590 may remain in contact with the respective flatbed sections even when their air springs are exhausted.

Figure 44:
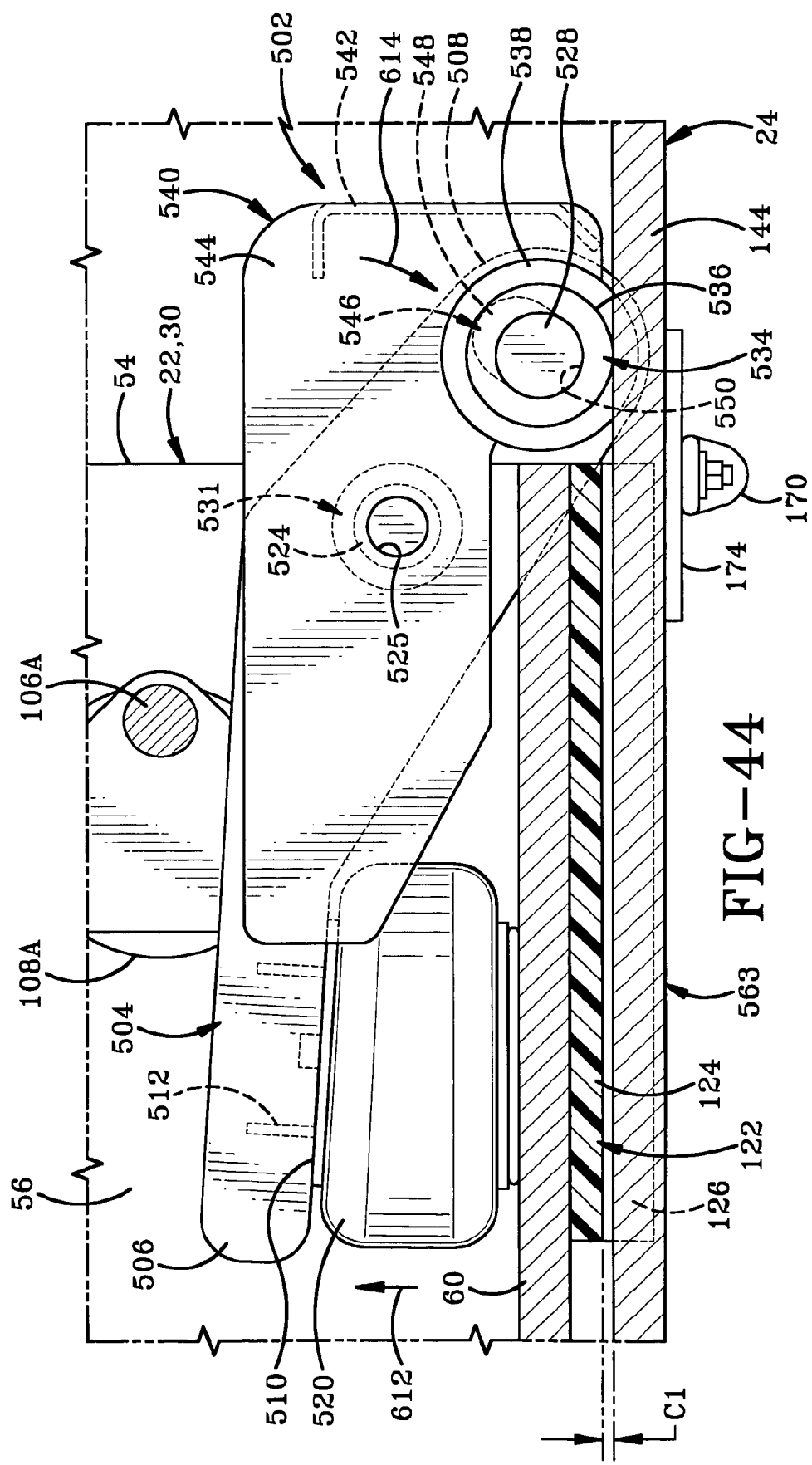
FIG. 44 is a view similar to FIG. 42 with the air bag being inflated and forcing the roll support assembly downward to separate the front and rear flatbed sections.
Figure 45:
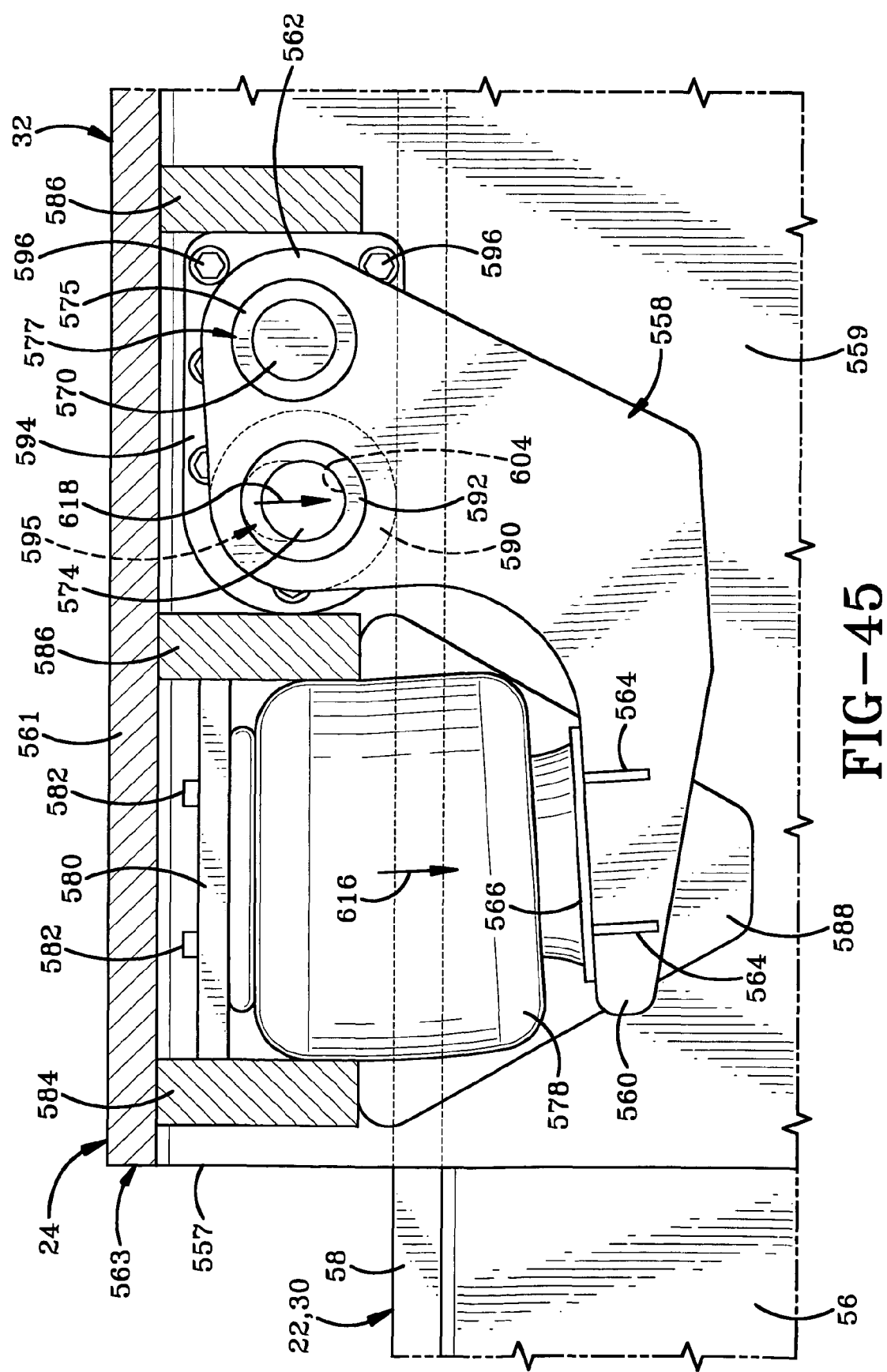
FIG. 45 is a view similar to FIG. 44 with the air bag being inflated and forcing the roll support assembly downward to separate the front and rear flatbed sections.
Figure 46:
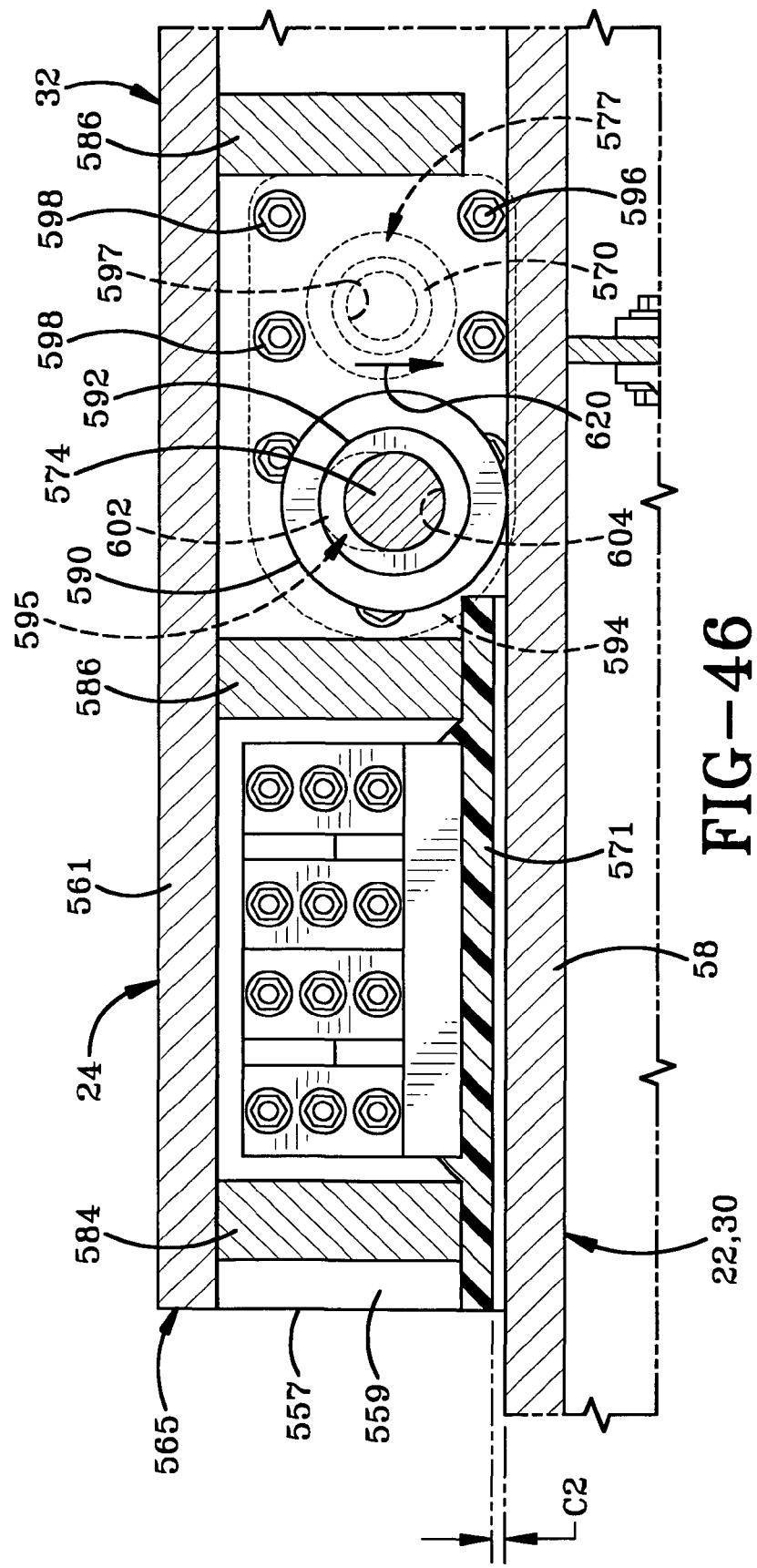
FIG. 46 is a view of FIG. 45 from the inside of the front and rear flatbed sections.

Moving on to FIGS. 44, 45 and 46 where the roller support assemblies are illustrated providing clearance between the front and rear flatbed sections. Specifically, FIG. 44 shows the front flatbed section providing a clearance C1 between slide member 122 and crossbar 144. Air spring 520 is inflated, thereby forcing lift bracket 510 in the direction associated with arrow 612. The vertical movement of the lift bracket forces front end 506 of pivot bracket 504 in the direction associated with arrow 612. The movement of front end 506 imparts a rotation about shaft 524. Further, the rotation of pivot bracket 504 forces roller shaft 528 in the direction associated with arrow 614 (in an arcuate fashion). The downward movement of roller shaft 528 also forces roller wheel 534 and outer surface 536 downward into crossbar 144. Further, the force from the air spring is large enough to lift crossbar 60 and slide member 122 off of crossbar 144 and provide clearance C1. Thus, the only interaction between front flatbed section 22 and rear flatbed section 24 when the roller assembly air springs are inflated is at outer surface 536 of roller wheel 534. Accordingly, the front flatbed section can be moved much easier with only the rolling resistance of outer surface 536 to overcome.

FIGS. 45 and 46 illustrate the rear flatbed trailer section roller support assembly providing a clearance C2. First, air spring 578 is inflated. Since the air spring is held in place at upper plate 580, inflation of the air spring forces plate 566 in the direction associated with arrow 616. The movement at front end 560 from plate 566 imparts a rotation of pivot bracket 558 around central shaft 570. The rotation of pivot bracket 558 also forces roller shaft 574 downward in the direction associated with arrow 618. Further, roller wheels 590 are forced towards top horizontal crossbar 58 in the direction associated with arrow 620. The force applied by air springs 578 through roller wheels 590 is sufficient to separate the top horizontal crossbar and slide member 571 to create clearance C2. Thus, the only interaction between front flatbed section 22 and rear flatbed section 24 when the roller support assembly air springs are inflated is at roller wheels 590. Accordingly, the front flatbed section can be moved much easier with only the rolling resistance of outer surface of the roller wheels 590 to overcome.

FIG. 47 illustrates two more steps. After both roller wheels 534 and 590 create clearances C1 and C2, front flatbed section 22 is slid within rear flatbed section 24 in the direction associated with arrow 622 or arrow 624 until the desired length is achieved. Next, air springs 520 of front section roller support assembly 502 are deflated so that roller wheels 534 move in the direction associated with arrow 626 and slide member 122 and crossbar 144 are once again in contact. Further, air springs 578 of rear section roller support assembly 556 are also deflated so that roller wheels 590 move in the direction associated with arrow 628 and slide member 571 and top horizontal crossbar 58 are once again in contact.

In summary, both the front and rear section roller support assemblies create a clearance by using air springs and roller wheels. In particular, when the clearances are created, the roller wheels are the only connection between the front and rear flatbed sections. Thus, the rolling resistance at the roller wheels is significantly smaller than the frictional resistance without the clearances. Further, the air springs can easily be exhausted so that the slide members and crossbars are once again in contact with each other.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An apparatus comprising:
a front flatbed vertical trailer section;
a rear flatbed trailer section;
a first support assembly carried by one of the front and rear flatbed trailer sections; and,
wherein the first support assembly moves the front and rear flatbed trailer sections axially relative to each other from a first position to a second position; wherein the support assembly includes a brace bracket defining an elongated slot, wherein the elongated slot limits the travel of the first support assembly and wherein a portion of the support assembly passes through the elongated slot.

2. The apparatus of claim 1 wherein the first support assembly includes at least one roller wheel, the at least one roller wheel provides rolling movement between the front and rear flatbed trailer sections upon the at least partial disengagement of the front and rear flatbed trailer sections.

3. The apparatus of claim 1 further comprising a second support assembly carried by the other of the front and rear flatbed trailer sections and wherein the first and second support assemblies move the front and rear flatbed trailer sections relative to each other in opposite directions.

4. The apparatus of claim 3 wherein the first support assembly is located on the bottom of the front flatbed trailer section and the second support assembly is located on the top of the rear flatbed trailer section.

5. The apparatus of claim 3 wherein the first and second support assemblies move the front flatbed trailer section within the rear flatbed trailer section.

6. The apparatus of claim 1 wherein the first support assembly further comprises a pivot, wherein the first support assembly rotates about the pivot.

7. The apparatus of claim 6 further comprising an air spring positioned at an end of the first support assembly and the air spring provides the rotation of the first support assembly.

8. The apparatus of claim 7 wherein the first support assembly includes a roller wheel which provides rolling movement between the front and rear flatbed trailer sections upon at least partial disengagement of the front and rear flatbed trailer sections; and the pivot is located closer to the roller wheel than the air spring.

9. The apparatus of claim 7 wherein the first support assembly includes a roller wheel which provides rolling movement between the front and rear flatbed trailer sections upon at least partial disengagement of the front and rear flatbed trailer sections; and the pivot and roller wheel are parallel to each other and offset from the air spring.

10. The apparatus of claim 1 further comprising a slide member extending between the front and rear flatbed trailer sections.

11. A method of extending a trailer comprising the steps of:
providing a front flatbed trailer section and a second rear flatbed trailer section with a first support assembly;
displacing a first section of the first support assembly in a first direction relative to a second section of the first support assembly to cause separation of the front and rear flatbed trailer sections in a vertical direction;
limiting travel of the first section relative to the second section with a portion of the first section within an elongated slot of the second section; and,
while the front and rear flatbed trailer sections are vertically separated, moving one of the front and rear flatbed trailer sections in one of a forward direction and a rearward direction relative to the other of the front and rear flatbed trailer sections.

12. The method of claim 11 wherein the step of displacing comprises the step of rotating the first section of the first support assembly relative to the second section of the first support assembly.

13. The method of claim 11 further comprising the step of displacing the first section of the first support assembly relative to the second section of the first support assembly in a second direction opposite the first direction to cause the vertically separated front and rear flatbed trailer sections to come into contact with one another via vertical movement of one of the front and rear flatbed trailer sections relative to the other of the front and rear flatbed trailer sections.

14. The method of claim 13 further comprising the step of inserting a locking pin between the first and second flatbed trailer sections.

15. The method of claim 11 further comprising the step of positioning the front flatbed trailer section between the first support assembly and a second support assembly.

16. The method of claim 11 wherein the step of displacing comprises the step of displacing the first section in the first direction to lift the front flatbed trailer section off of the rear flatbed trailer section; and further comprising the step of displacing a first section of a second support assembly relative to a second section of the second support assembly to lift the rear flatbed trailer section off of the front flatbed trailer section.

17. The method of claim 11 wherein the first section comprises a pivot bracket; and the second section comprises a brace bracket in which the elongated slot is formed; the step of displacing comprises the step of pivoting the pivot bracket in the first direction relative to the brace bracket.

18. An extendable flatbed trailer comprising:
a front flatbed trailer section;
a rear flatbed trailer section which is movable forward and rearward relative to the front flatbed trailer section to provide respectively a retracted position of the trailer and an extended position of the trailer;
a first support assembly which is carried by one of the front and rear flatbed trailer sections and which comprises a first section, a second section and a first roller wheel rotatably mounted on the first section;
a second support assembly which is carried by one of the front and rear flatbed trailer sections and which comprises a third section, a fourth section and a second roller wheel rotatably mounted on the third section; and
wherein the front flatbed trailer section is lifted off of the rear flatbed trailer section in response to movement of the first section relative to the second section;
the first roller wheel provides forward and rearward rolling movement between the front and rear flatbed trailer sections when the front flatbed trailer section is lifted off of the rear flatbed trailer section by the first support assembly;
the rear flatbed trailer section is lifted off of the front flatbed trailer section in response to movement of the third section relative to the fourth section; and
the second roller wheel provides forward and rearward rolling movement between the front and rear flatbed trailer sections when the rear flatbed trailer section is lifted off of the front flatbed trailer section by the second support assembly.

19. The extendable trailer of claim 18 further comprising a first elongated slot formed in the second section; a portion of the first section within the first elongated slot; a second elongated slot formed in the fourth section; a portion of the third section within the second elongated slot; and wherein the first elongated slot limits the travel of the first section relative to the second section; and the second elongated slot limits the travel of the third section relative to the fourth section.

20. The extendable trailer of claim 19 wherein the first section pivots relative to the second section; and the third section pivots relative to the fourth section.

* * * * *